US012671664B2

(12) United States Patent
Kitoh

(10) Patent No.: US 12,671,664 B2
(45) Date of Patent: *Jun. 30, 2026

(54) INFORMATION PROCESSING SYSTEM AND INFORMATION PROCESSING METHOD

(71) Applicant: Ricoh Company, Ltd., Tokyo (JP)

(72) Inventor: Naoya Kitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,575

(22) Filed: Dec. 19, 2024

(65) Prior Publication Data

US 2025/0126082 A1 Apr. 17, 2025

Related U.S. Application Data

(63) Continuation of application No. 18/504,539, filed on Nov. 8, 2023, now Pat. No. 12,218,891, which is a
(Continued)

(30) Foreign Application Priority Data

Sep. 20, 2019 (JP) ................................. 2019-172291

(51) Int. Cl.
H04L 51/02 (2022.01)
H04L 51/046 (2022.01)
H04L 51/216 (2022.01)
(52) U.S. Cl.
CPC ............ H04L 51/02 (2013.01); H04L 51/046 (2013.01); H04L 51/216 (2022.05)
(58) Field of Classification Search
CPC ...... H04L 51/02; H04L 51/046; H04L 51/216
(Continued)

(56) References Cited

U.S. PATENT DOCUMENTS 8,706,523 B2 * 4/2014 Kulawiec ............... G16H 20/10
705/2
9,531,862 B1 * 12/2016 Vadodaria ............... H04L 51/02
(Continued)

FOREIGN PATENT DOCUMENTS

EP 3541025 B1 * 10/2020 ........... H04L 51/216
JP 2007-072835 3/2007
(Continued)

OTHER PUBLICATIONS

Japanese Office Action for JP2019-172291 mailed on Feb. 21, 2023.
(Continued)

*Primary Examiner* — Anthony Mejia
(74) *Attorney, Agent, or Firm* — IPUSA, PLLC

(57) ABSTRACT

An information processing system includes a user terminal that receives input from a user; an operator terminal that receives input from an operator; and one or more information processing apparatuses connected to the user terminal and the operator terminal. The information processing system includes circuitry configured to: acquire identification information from the user terminal and input information input to the user terminal; search response information for the input information; respond to the user terminal with the response information in response to the input information; determine, based on the identification information acquired from the user terminal, whether to perform a switching operation to perform a chat between the user terminal and the operator terminal; and control the switching operation based on a determination result.

14 Claims, 26 Drawing Sheets

Related U.S. Application Data continuation of application No. 17/663,279, filed on May 13, 2022, now Pat. No. 11,855,935, which is a continuation of application No. 17/000,791, filed on Aug. 24, 2020, now Pat. No. 11,362,970.

(58) Field of Classification Search
USPC .......................................................... 709/206
See application file for complete search history.

(56) References Cited

U.S. PATENT DOCUMENTS

| | | | | |
|---|---|---|---|---|
| 9,973,457 | B2 * | 5/2018 | Cauchois | .............. H04L 51/046 |
| 10,629,191 | B1 * | 4/2020 | Cheng | .................... G06F 40/205 |
| 10,997,529 | B2 * | 5/2021 | Jeon | .................. H04M 1/72436 |
| 11,362,970 | B2 | 6/2022 | Kitoh | |
| 11,531,992 | B2 * | 12/2022 | Ritchie | .................... G06F 16/29 |
| 2004/0054743 | A1 * | 3/2004 | McPartlan | .......... H04M 3/5235 |
| | | | | 709/206 |
| 2006/0026241 | A1 * | 2/2006 | Dezonno | .............. G06Q 10/107 |
| | | | | 709/206 |
| 2008/0147406 | A1 * | 6/2008 | Da Palma | ............... H04L 51/02 |
| | | | | 704/E15.04 |
| 2008/0152121 | A1 * | 6/2008 | Mandalia | ................ H04M 3/51 |
| | | | | 379/265.01 |
| 2010/0125592 | A1 * | 5/2010 | Dauginas | .............. G06Q 30/02 |
| | | | | 707/E17.014 |
| 2010/0250691 | A1 * | 9/2010 | Tomkow | ................. H04L 51/23 |
| | | | | 709/206 |
| 2013/0275862 | A1 * | 10/2013 | Adra | ..................... H04L 51/046 |
| | | | | 715/234 |
| 2014/0257908 | A1 * | 9/2014 | Steiner | ............ G06Q 10/06311 |
| | | | | 705/7.23 |
| 2015/0235289 | A1 * | 8/2015 | Jeremias | ........... G06Q 30/0641 |
| | | | | 705/26.41 |
| 2015/0302103 | A1 * | 10/2015 | Jeremias | ............. G06F 16/9535 |
| | | | | 715/758 |
| 2016/0099892 | A1 * | 4/2016 | Palakovich | ............. H04L 51/04 |
| | | | | 709/206 |
| 2016/0232496 | A1 * | 8/2016 | Underdahl Ingram | ...................... |
| | | | | G06Q 10/1093 |
| 2017/0103346 | A1 * | 4/2017 | Bodell | .......... G06Q 10/063114 |
| 2017/0230312 | A1 * | 8/2017 | Barrett | .................... H04L 51/02 |
| 2018/0143973 | A1 * | 5/2018 | Hambrick | ............. H04L 51/046 |
| 2018/0227251 | A1 | 8/2018 | Takishima et al. | |
| 2018/0276723 | A1 * | 9/2018 | Kannan | .................. H04L 51/214 |
| 2018/0285413 | A1 * | 10/2018 | Vora | ...................... G06F 16/245 |
| 2018/0376003 | A1 * | 12/2018 | Shinseki | ................. H04L 51/02 |
| 2019/0012390 | A1 * | 1/2019 | Nishant | .............. G06F 16/9535 |
| 2019/0207877 | A1 * | 7/2019 | Chung | .................... G06N 3/006 |
| 2019/0222545 | A1 | 7/2019 | Kakiuchi | |
| 2019/0258456 | A1 * | 8/2019 | Byun | ...................... H04L 51/02 |
| 2019/0327191 | A1 * | 10/2019 | Garcia | .................... G06N 5/025 |
| 2020/0026758 | A1 | 1/2020 | Kitoh | |
| 2020/0099790 | A1 * | 3/2020 | Ma | ........................ G06Q 30/016 |
| 2020/0106723 | A1 * | 4/2020 | Nakamura | .......... G06F 16/3329 |
| 2020/0225832 | A1 | 7/2020 | Niki et al. | |
| 2020/0356237 | A1 * | 11/2020 | Moran | ................. G06F 3/0481 |
| 2021/0117893 | A1 * | 4/2021 | Sohum | ................ G06Q 30/016 |
| 2022/0266156 | A1 * | 8/2022 | Vaccari | ................... H04L 67/53 |
| 2025/0126082 | A1 * | 4/2025 | Kitoh | .................... H04L 51/216 |

FOREIGN PATENT DOCUMENTS

| | | | | |
|---|---|---|---|---|
| JP | 6236510 | 11/2017 | | |
| JP | 2018-098792 | 6/2018 | | |
| JP | 2018-128843 | 8/2018 | | |
| JP | 2018-163525 | 10/2018 | | |
| JP | 2019-028783 | 2/2019 | | |
| JP | 2019-128737 | 8/2019 | | |
| WO | WO-2017112796 | A1 * | 6/2017 | ............ H04L 51/02 |
| WO | 2018/213508 | 11/2018 | | |
| WO | 2019/064464 | 4/2019 | | |

OTHER PUBLICATIONS

Japanese Office Action for JP2019-172291 mailed on May 23, 2023.
Japanese Office Action for 2023-204268 mailed on Nov. 19, 2024.
Kawabata, Takayuki, Introduction of dialogue platform "AI Messenger", 78th Workshop on Language and Speech Understanding and Dialogue Processing (SIG-SLUD-B505), Japan, The Japanese Society for Artificial Intelligence, Oct. 1, 2016., 59-60.

* cited by examiner

FIG. 7A

| FIG. 7 | FIG. 7A |
| | FIG. 7B |

START

R

S31

- SEARCH FROM ALL CATEGORIES
- SEARCH FROM SELECTED CATEGORY
- SELECT FROM FAQ

S31

SEARCH FROM ALL CATEGORIES

S32 DISPLAY "INPUT QUESTION" AND WAIT FOR INPUT

QUESTION IS INPUT

S33

ONE CANDIDATE → AN-SWER

TWO OR MORE CANDIDATES

CANDIDATE NOT FOUND

S34 DISPLAY CANDIDATES TO SELECT FROM

CANDIDATE SELECTED

S35 → AN-SWER

APPROPRIATE CANDIDATE NOT FOUND → HD

S36 DISPLAY "APPROPRIATE ANSWER IS NOT FOUND" SEARCH BY DIFFERENT METHOD OR DIFFERENT KEYWORD" (FEEDBACK [NO])

| ID | CATEGORY NAME | UPDATED DATE AND TIME |
|---|---|---|
| 0-1 | MOVING IN | 07/11/2017 07:07 |
| 0-2 | MOVING OUT | 07/11/2017 07:10 |
| 0-3 | CELEBRATION | 02/07/2018 16:40 |
| 0-4 | MOURNING | 02/07/2018 16:55 |
| 0-5 | INSURANCE | 03/14/2017 10:30 |
| 0-6 | UNION | 03/08/2018 09:30 |
| 0-7 | DELIVERY | 06/12/2018 14:20 |
| ⋮ | ⋮ | ⋮ |

FIG. 9

| ID | QUESTION | SIMILAR QUESTION | ANSWER | CATE-GORY ID | UPDATED DATE AND TIME |
|----|----------|-----------------|--------|--------------|----------------------|
| ⋮ | ⋮ | ⋮ | ⋮ | ⋮ | ⋮ |
| 1-11 | NECESSARY PROCEEDINGS WHEN A CHILD IS BORN | — | WHEN AN EMPLOYEE OR HIS SPOUSE GIVES BIRTH, FOLLOWING APPLICATIONS ARE REQUIRED.<br><br>1. FAMILY STATUS CHANGE APPLICATION (MANDATORY)<br>2. BIRTH GIFT APPLICATION<br>3. HEALTH INSURANCE DEPENDENT NOTIFICATION<br>4. HEALTH INSURANCE BIRTH ALLOWANCE APPLICATION<br>5. APPLICATION FOR SUSPENSION OF COMMUTING ALLOWANCE | 0-03 | 02/07/2018 16:22 |
| 1-12 | BIRTH GIFT APPLICATION | — | WHEN AN EMPLOYEE OR HIS SPOUSE GIVES BIRTH, CHILD BIRTH GIFT AND PART OF CHILDBIRTH COST IS PAID, AND LEAVE IS GIVEN. | 0-03 | 02/07/2018 16:40 |
| ⋮ | ⋮ | ⋮ | ⋮ | ⋮ | ⋮ |
| 1-33 | HOW TO CHECK ESTIMATED DELIVERY DATE | ⋮ | SELECT OR ENTER THE FIELD OF ORDER. | 0-07 | 06/12/2018 14:20 |
| ⋮ | ⋮ | ⋮ | ⋮ | ⋮ | ⋮ |

FIG. 10

| ID | SESSION ID | CATEGORY ID OF QUESTION | QUESTION ID | INPUT BY USER | FEED-BACK | DATE AND TIME |
|---|---|---|---|---|---|---|
| 3-1 | zeta/Guest/aaa···.bbbb | 0-05 | 1-55 | I WANT TO KNOW THE TYPE OF INSURANCE AVAILABLE. | Yes | 04/11/2018 10:15 |
| 3-2 | zeta/Guest/36c2a9cc-6258-4276-ab0d-d2b739ac65a3 | 0-03 | 1-11 | NECESSARY PROCEEDINGS WHEN A CHILD IS BORN | Yes | 03/30/2018 14:01 |
| 3-3 | zeta/Guest/36c2a9cc-6258-4276-ab0d-d2b739ac65a3 | 0-03 | 1-12 | BIRTH GIFT APPLICATION | No | 03/30/2018 14:15 |
| 3-4 | zeta/Guest/xxx····.yyy···.zzz | 0-05 | 1-56 | HOW TO JOIN INSURANCE | No | ⋮ |
| 3-5 | zeta/Guest/xxx····.yyy···.zzz | 0-05 | 1-57 | HOW TO JOIN LIFE INSURANCE | Yes | ⋮ |
| 3-6 | zeta/Guest/xxx····.yyy···.zzz | 0-05 | 1-58 | HOW TO CANCEL INSURANCE | Yes | ⋮ |
| ⋮ | ⋮ | ⋮ | ⋮ | ⋮ | ⋮ | ⋮ |

| ID | SESSION ID | SPEAKER 0:ADMIN-ISTRATOR 1:USER | MESSAGE | MESSAGE TYPE ID CATEGORY:5-0 QUESTION-ANSWER:5-1 SCENARIO:5-2 | CON-TENT ID | DATE AND TIME |
|---|---|---|---|---|---|---|
| 4-1 | zeta/Guest/36c2a9cc-6258-4276-ab0d-d2b739ac65a3 | 0 | DO YOU HAVE ANY QUESTIONS? PLEASE INPUT YOUR QUESTION OR SELECT METHOD TO SEARCH FROM THE BUTTON. | 5-2 | 6-1 | 03/30/2018 14:01:29.3 |
| 4-2 | zeta/Guest/36c2a9cc-6258-4276-ab0d-d2b739ac65a3 | 1 | NECESSARY PROCEEDINGS WHEN A CHILD IS BORN | - | - | 03/30/2018 14:03:31 1 |
| 4-3 | zeta/Guest/36c2a9cc-6258-4276-ab0d-d2b739ac65a3 | 0 | WHEN AN EMPLOYEE OR HIS SPOUSE GIVES BIRTH, FOLLOWING APPLICA-TIONS ARE REQUIRED. 1. FAMILY STATUS CHANGE APPLICATION (MANDATORY) 2. BIRTH GIFT APPLICATION 3. HEALTH INSURANCE DEPENDENT NOTIFICATION 4. HEALTH INSURANCE BIRTH ALLOWANCE APPLICATION 5. APPLICATION FOR SUSPENSION OF COMMUTING ALLOWANCE | 5-1 | 1-11 | 03/30/2018 14:03:31.7 |
| 4-4 | zeta/Guest/36c2a9cc-6258-4276-ab0d-d2b739ac65a3 | 0 | DOES THE ANSWER SOLVE YOUR PROBLEM? SELECTING YES OR NO COMPLETES THE ANSWER. | 5-2 | 6-3 | 03/30/2018 14:03:32.4 |
| 4-5 | zeta/Guest/36c2a9cc-6258-4276-ab0d-d2b739ac65a3 | 1 | YES | 5-2 | 6-4 | 03/30/2018 14:03:35.6 |

| | | | | | | |
|---|---|---|---|---|---|---|
| 4-6 | zeta/Guest/36c2a9cc-6258-4276-ab0d-d2b739ac65a3 | 0 | THANK YOU. | 5-2 | 6-6 | 03/30/2018 14:03:36.3 |
| 4-7 | zeta/Guest/36c2a9cc-6258-4276-ab0d-d2b739ac65a3 | 0 | DO YOU HAVE ANY QUESTIONS? PLEASE INPUT YOUR QUESTION OR SELECT METHOD TO SEARCH FROM THE BUTTON. | 5-2 | 6-1 | 03/30/2018 14:03:38.3 |
| 4-8 | zeta/Guest/36c2a9cc-6258-4276-ab0d-d2b739ac65a3 | 1 | BIRTH GIFT APPLICATION | - | - | 03/30/2018 14:06:53.1 |
| 4-9 | zeta/Guest/36c2a9cc-6258-4276-ab0d-d2b739ac65a3 | 0 | THERE ARE SEVERAL CANDIDATES. SELECT APPROPRIATE CANDIDATE NECESSARY PROCEEDINGS WHEN A CHILD IS BORN BIRTH GIFT APPLICATION APPROPRIATE CANDIDATE DOES NOT EXIST | 5-1 | 1-13 | 03/30/2018 14:06:53.8 |
| 4-10 | zeta/Guest/36c2a9cc-6258-4276-ab0d-d2b739ac65a3 | 1 | BIRTH GIFT | - | - | 03/30/2018 14:08:56.5 |
| 4-11 | zeta/Guest/36c2a9cc-6258-4276-ab0d-d2b739ac65a3 | 0 | WHEN AN EMPLOYEE OR HIS SPOUSE GIVES BIRTH, CHILD BIRTH GIFT AND PART OF CHILDBIRTH COST IS PAID, AND LEAVE IS GIVEN. | 5-1 | 1-12 | 03/30/2018 14:08:56.9 |
| 4-12 | zeta/Guest/36c2a9cc-6258-4276-ab0d-d2b739ac65a3 | 0 | DOES THE ANSWER SOLVE YOUR PROBLEM? SELECTING YES OR NO COMPLETES THE ANSWER. | 5-2 | 6-3 | 03/30/2018 14:08:57.4 |
| 4-13 | zeta/Guest/36c2a9cc-6258-4276-ab0d-d2b739ac65a3 | 1 | NO | 5-2 | 6-5 | 03/30/2018 14:09:32.5 |
| 4-14 | zeta/Guest/36c2a9cc-6258-4276-ab0d-d2b739ac65a3 | 0 | PLEASE CONTACT SUPPORT DESK OR SEARCH BY DIFFERENT METHOD OR DIFFERENT KEYWORD. | 5-2 | 6-7 | 03/30/2018 14:09:32.9 |

Figure 20:
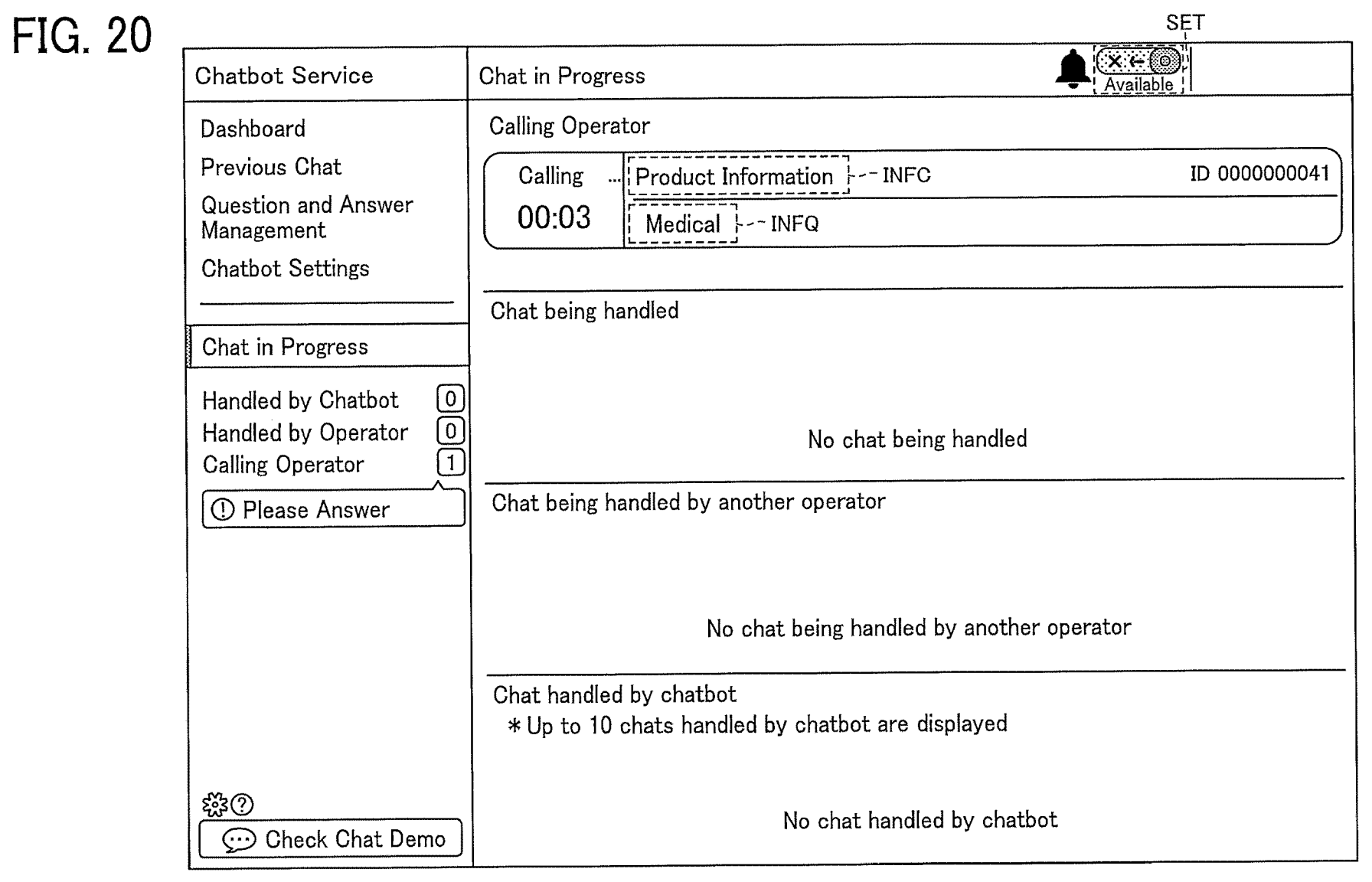

SET

Available

Chatbot Service

Chat in Progress

Dashboard

Previous Chat

Question and Answer
Management

Chatbot Settings

Chat in Progress

Calling Operator

Calling    ···| Product Information |··· INFC

00:03    | Medical |··· INFQ

ID 0000000041

Chat being handled

Handled by Chatbot    [0]

Handled by Operator    [0]

Calling Operator    [1]

① Please Answer

No chat being handled

Chat being handled by another operator

No chat being handled by another operator

Chat handled by chatbot

* Up to 10 chats handled by chatbot are displayed

No chat handled by chatbot

⚙?    (···) Check Chat Demo

Figure 22:
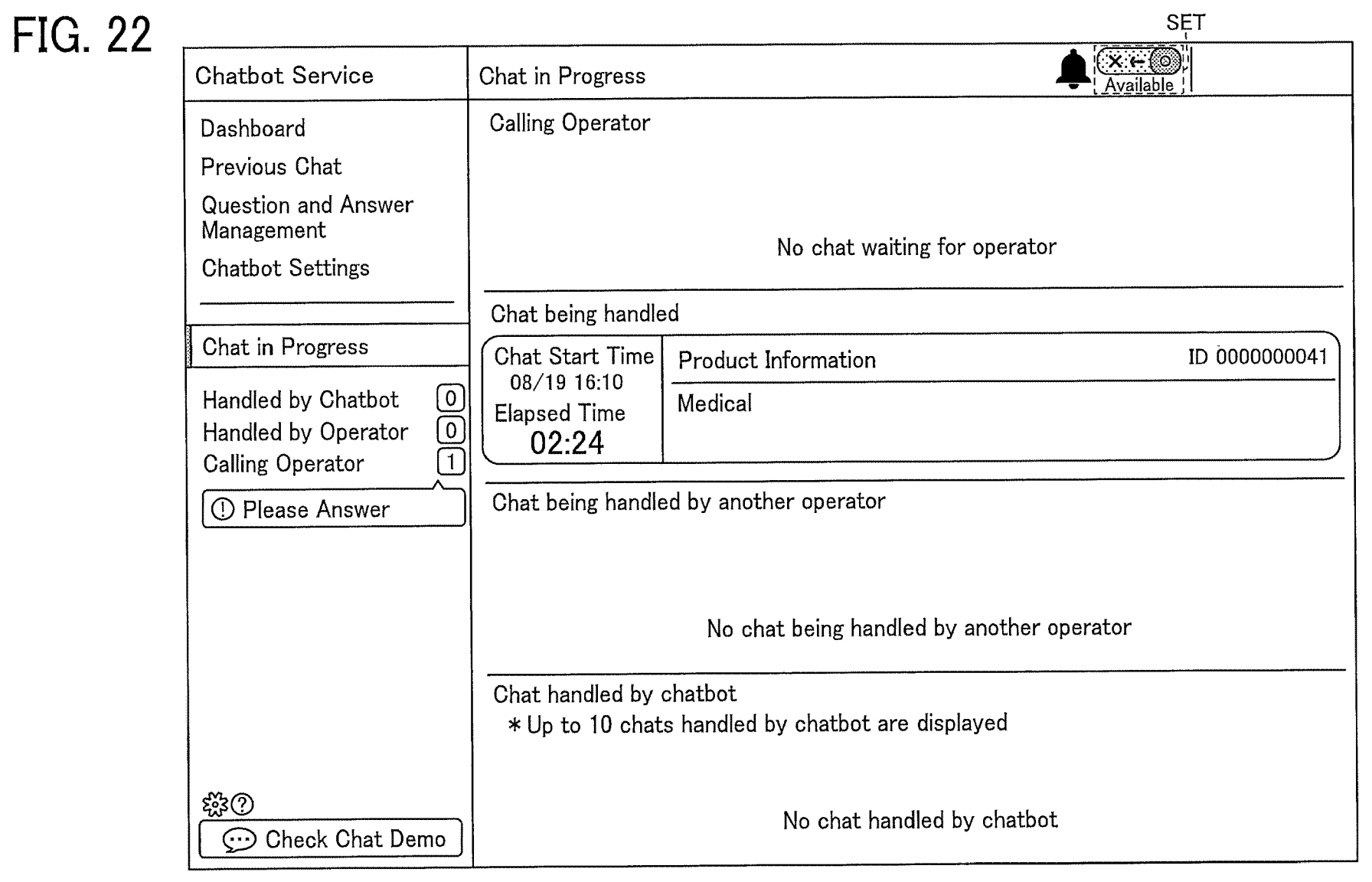

SET

Available

Chatbot Service

Chat in Progress

Dashboard

Previous Chat

Question and Answer Management

Chatbot Settings

Calling Operator

No chat waiting for operator

Chat being handled

Chat in Progress

Handled by Chatbot 0

Handled by Operator 0

Calling Operator 1

Please Answer

| Chat Start Time | Product Information | ID 0000000041 |
|---|---|---|
| 08/19 16:10 | Medical | |
| Elapsed Time 02:24 | | |

Chat being handled by another operator

No chat being handled by another operator

Chat handled by chatbot
* Up to 10 chats handled by chatbot are displayed

No chat handled by chatbot

Check Chat Demo

FIG. 25

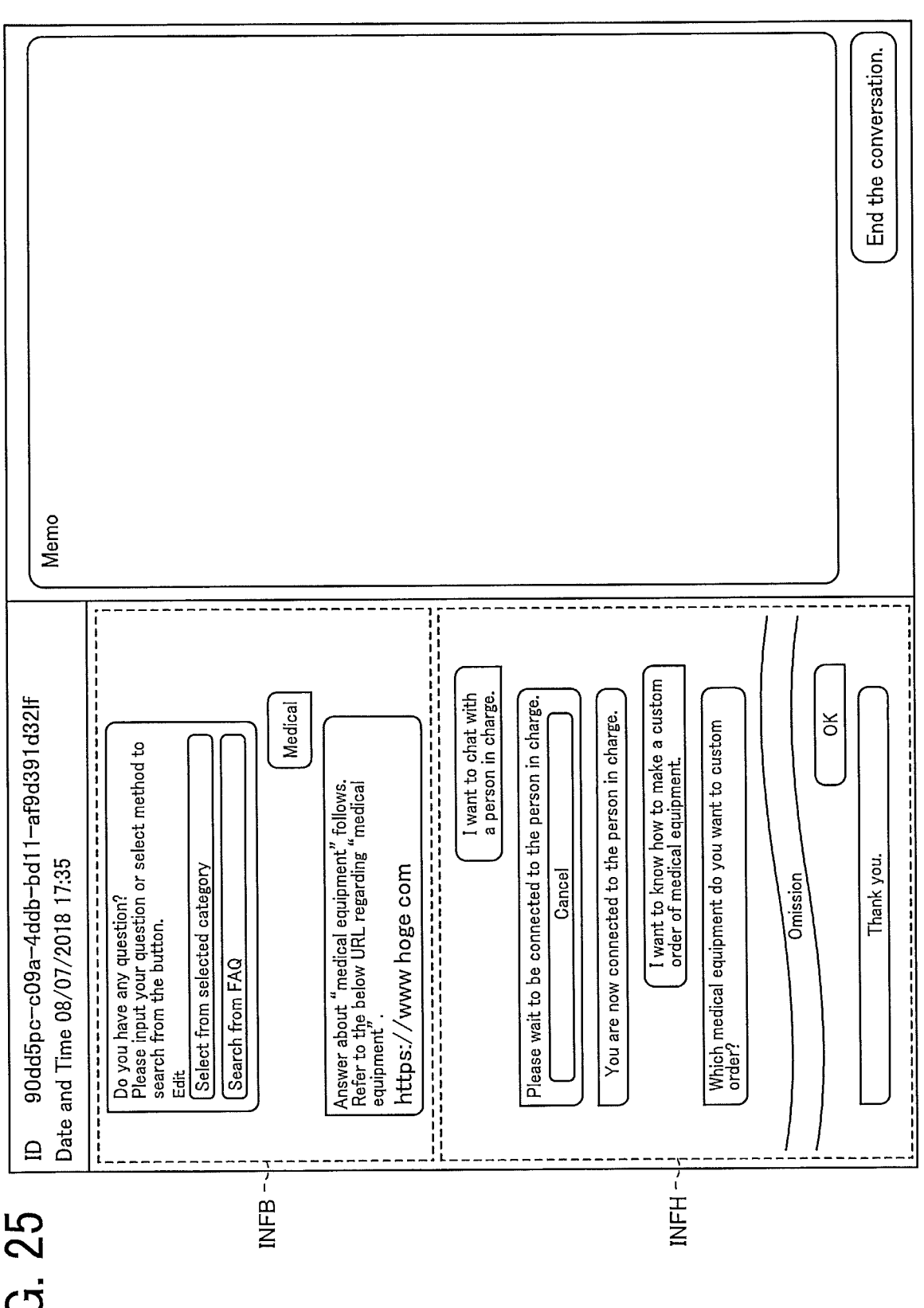

ID　90dd5pc-c09a-4ddb-bd11-af9d391d32lf

Date and Time 08/07/2018 17:35

Do you have any question?
Please input your question or select method to search from the button.
Edit Select from selected category Search from FAQ Medical Answer about "medical equipment" follows.
Refer to the below URL regarding "medical equipment".

https://www.hoge.com

INFB

I want to chat with a person in charge.

Please wait to be connected to the person in charge.

Cancel

You are now connected to the person in charge.

I want to know how to make a custom order of medical equipment.

Which medical equipment do you want to custom order?

Omission

OK

Thank you.

INFH

Memo

End the conversation.

FIG. 26

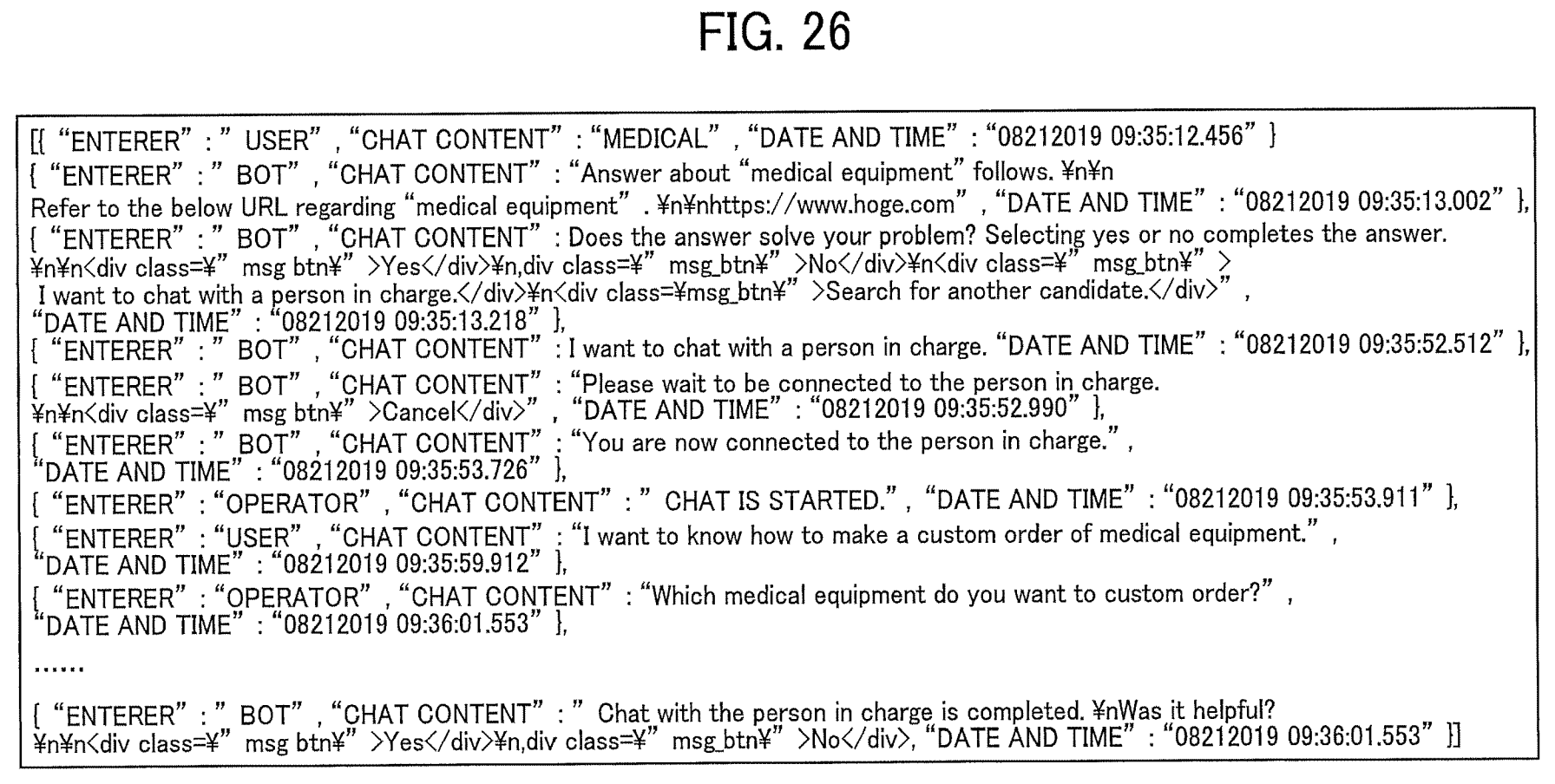

[[ "ENTERER" : " USER" , "CHAT CONTENT" : "MEDICAL" , "DATE AND TIME" : "08212019 09:35:12.456" ]
{ "ENTERER" : " BOT" , "CHAT CONTENT" : "Answer about "medical equipment" follows. ¥n¥n
Refer to the below URL regarding "medical equipment" .¥n¥nhttps://www.hoge.com" , "DATE AND TIME" : "08212019 09:35:13.002" ],
{ "ENTERER" : " BOT" , "CHAT CONTENT" : Does the answer solve your problem? Selecting yes or no completes the answer.
¥n¥n<div class=¥" msg btn¥" >Yes</div>¥n,div class=¥" msg_btn¥" >No</div>¥n<div class=¥" msg_btn¥" >
I want to chat with a person in charge.</div>¥n<div class=¥msg_btn¥" >Search for another candidate.</div>" ,
"DATE AND TIME" : "08212019 09:35:13.218" ],
{ "ENTERER" : " BOT" , "CHAT CONTENT" : I want to chat with a person in charge. "DATE AND TIME" : "08212019 09:35:52.512" ],
{ "ENTERER" : " BOT" , "CHAT CONTENT" : "Please wait to be connected to the person in charge.
¥n¥n<div class=¥" msg btn¥" >Cancel</div>" , "DATE AND TIME" : "08212019 09:35:52.990" ],
{ "ENTERER" : " BOT" , "CHAT CONTENT" : "You are now connected to the person in charge. ,
"DATE AND TIME" : "08212019 09:35:53.726" ],
{ "ENTERER" : "OPERATOR" , "CHAT CONTENT" : " CHAT IS STARTED. , "DATE AND TIME" : "08212019 09:35:53.911" ],
{ "ENTERER" : "USER" , "CHAT CONTENT" : "I want to know how to make a custom order of medical equipment." ,
"DATE AND TIME" : "08212019 09:35:59.912" ],
{ "ENTERER" : "OPERATOR" , "CHAT CONTENT" : "Which medical equipment do you want to custom order?" ,
"DATE AND TIME" : "08212019 09:36:01.553" ],
. . . . . . .
{ "ENTERER" : " BOT" , "CHAT CONTENT" : " Chat with the person in charge is completed. ¥nWas it helpful?
¥n¥n<div class=¥" msg btn¥" >Yes</div>¥n,div class=¥" msg_btn¥" >No</div>,"DATE AND TIME" : "08212019 09:36:01.553" ]]

FIG. 27

INFORMATION PROCESSING SYSTEM AND INFORMATION PROCESSING METHOD

CROSS-REFERENCE TO RELATED APPLICATIONS

The present application is a continuation application of U.S. patent application Ser. No. 18/504,539 filed on Nov. 8, 2023, which is a continuation application of U.S. patent application, Ser. No. 17/663,279 filed on May 13, 2022, which is a continuation application of U.S. patent application Ser. No. 17/000,791 filed on Aug. 24, 2020, which is based on and claims priority to Japanese Patent Application No. 2019-172291, filed on Sep. 20, 2019 in the Japan Patent Office, the disclosure of which are incorporated by reference herein in its entirety.

BACKGROUND

Technical Field

The present disclosure relates to an information processing system and an information processing method.

Background Art

In a conventional technique so-called chatbot (sometimes referred to simply as a "bot"), a device such as a computer first recognizes a pattern of text, voice, or image input by a user through a network and based on result of pattern recognition, answers conversation or questions from the user or performs device control.

Specifically, the chatbot prepares a database and the like in advance such that the chatbot is able to answer questions entered by the user. Then, when the chatbot prepares to send the answer to the user, the sending is temporarily stopped. Next, an operator checks the data immediately before sending. After this check, the chatbot sends the answer to the user based on the instruction of the operator. A method that enables the operator to confirm the answer such as described above is known.

There is also a chatbot that provides a manned support function for starting a chat with an operator in response to a user's instruction.

SUMMARY

Embodiments of the present disclosure describes an information processing system and an information processing method. The information processing system acquires input information input to the user terminal, searches response information for the input information, responds to the user terminal with the response information in response to the input information, determines whether to display a switching reception screen configured to receive a switching operation to perform a chat between the user terminal and the operator terminal, and displays the switching reception screen on the user terminal based on a determination result.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7A and FIG. 7B are diagrams illustrating an example of a flow of dialog based on scenario information according to embodiments of the present disclosure;

FIG. 8 is a diagram illustrating an example of category information according to embodiments of the present disclosure;

FIG. 9 is a diagram illustrating an example of question-answer information according to embodiments of the present disclosure;

FIG. 10 is a diagram illustrating an example of inquiry history information according to embodiments of the present disclosure;

FIG. 11A and FIG. 11B are diagrams illustrating an example of dialog history information according to embodiments of the present disclosure;

FIG. 20 is a diagram illustrating an example of an operation screen displayed by the operator terminal according to embodiments of the present disclosure;

FIG. 21 is a sequence diagram illustrating an example of a manned support setting process according to embodiments of the present disclosure;

FIG. 22 is a diagram illustrating an example of the operation screen during the manned chat according to embodiments of the present disclosure;

FIG. 25 is a diagram illustrating an example of a screen displayed by the operator terminal during the manned support according to embodiments of the present disclosure;

FIG. 26 is a diagram illustrating an example of a history according to embodiments of the present disclosure; and FIG. 27 is a block diagram illustrating an example of a functional configuration of the information processing system according to embodiments of the present disclosure.

Figure 1:
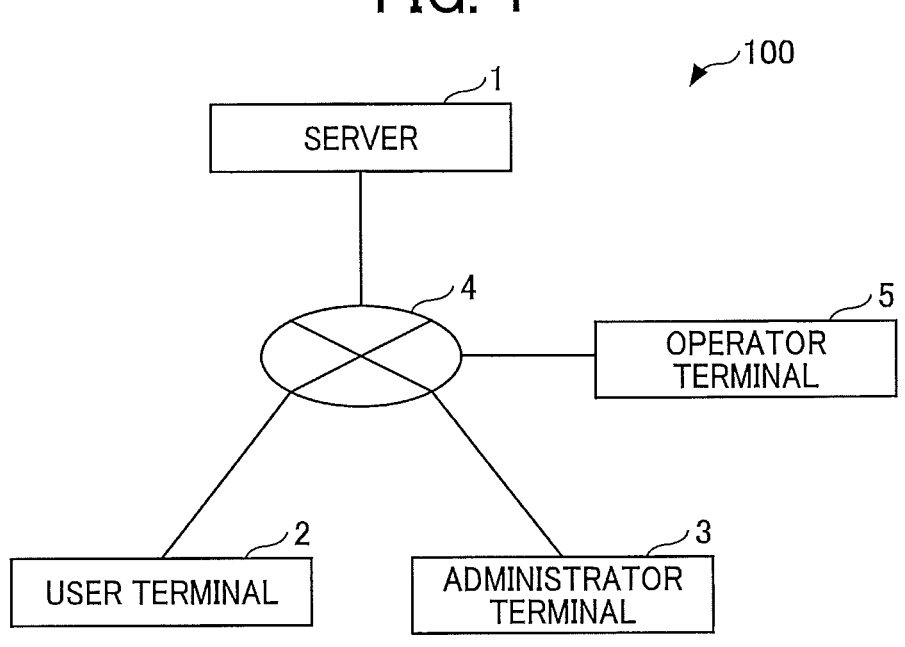
FIG. 1 is a block diagram illustrating an example of an overall configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, a description is given of several embodiments of the present disclosure with reference to the drawings. In the description of the drawings, the same elements are denoted by the same reference numerals, and redundant description is omitted. In addition, the illustrated specific example is merely an example, and a configuration other than the illustrated configuration may be included.

FIG. 1 is a block diagram illustrating an example of an overall configuration of an information processing system. For example, a chatbot system 100 is an example of an information processing system and includes a server 1, a user terminal 2, an administrator terminal 3, an operator terminal 5, and the like, which are examples of information processing apparatuses.

The server 1 is an example of the information processing apparatus that provides chatbot service.

The user terminal 2 is an information processing apparatus that a user performs operations such as input in the chatbot service.

The administrator terminal 3 is an information processing apparatus operated by an administrator or the like in order to manage the server 1 or the like.

The operator terminal 5 is an information processing apparatus in which an operator who operates the chatbot service performs operations such as input in the chatbot service.

The server 1, the user terminal 2, the administrator terminal 3, and the operator terminal 5 are connected to each other through, for example, a communication network 4 or the like.

For example, the communication network 4 is the internet or the like. The communication network 4 may be a communication network such as a local area network (LAN), a wide area network (WAN), a short-range communication, or a combination thereof, which performs wired or wireless communication.

The server 1 communicates with the user terminal 2, the administrator terminal 3, the operator terminal 5, and the like. For example, the server 1 provides the chatbot service or the like in which response information, such as an answer, is returned to input information such as a question input by the user.

Further, the server 1 provides services such as a service of message transmission/reception between the user and the operator, or between a plurality of users, which is so-called chat. The server 1 provides an instant message service or the like. Note that various services may be provided by a plurality of information processing apparatuses. Hereinafter, an example is described in which one unit of the server 1 provides the service.

Figure 2:
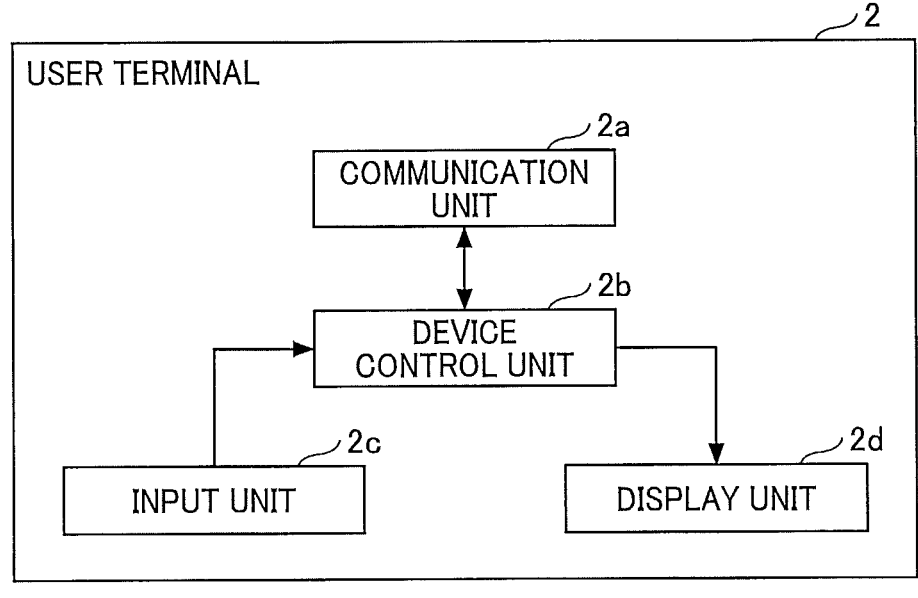
FIG. 2 is a block diagram illustrating an example of a functional configuration of a user terminal according to embodiments of the present disclosure.

FIG. 2 is a block diagram illustrating an example of a functional configuration of the user terminal. For example, the user terminal 2 includes a communication unit 2a, a device control unit 2b, an input unit 2c, a display unit 2d, and the like. A plurality of the user terminals may be included in the information processing system.

The communication unit 2a communicates with an external device through the communication network 4.

The device control unit 2b controls the overall operation of the user terminal 2. For example, the device control unit 2b transmits/receives information, commands, and the like through the communication unit 2a. In addition, for example, the device control unit 2b controls an interactive application or the like, which is an example of application software such as a browser or other interactive application for receiving the chatbot service from the server 1, according to a program.

The input unit 2c receives inputs of information and commands from users and outputs the received information to the device control unit 2b and the like.

The display unit 2d displays various screens. For example, the display unit 2d displays a screen for the interactive application or the like. The display unit 2d and the input unit 2c may be integrated. The interactive application is installed in advance. The interactive application may be a browser or the like.

Figure 3:
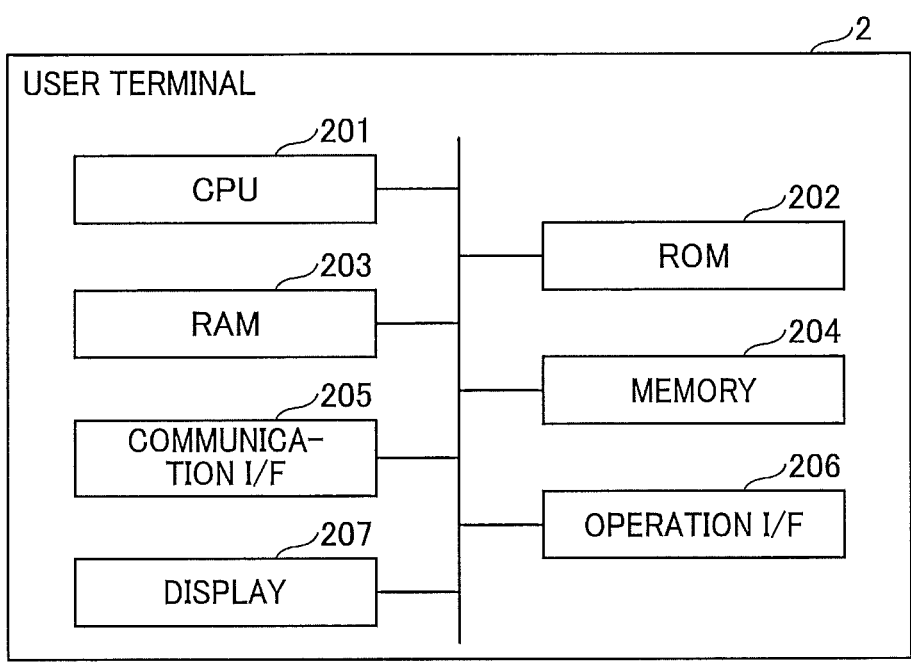
FIG. 3 is a block diagram illustrating an example of a hardware configuration of the user terminal according to embodiments of the present disclosure.

FIG. 3 is a block diagram illustrating an example of a hardware configuration of the user terminal. For example, the user terminal 2 includes a central processing unit (CPU) 201, a read only memory (ROM) 202, a random access memory (RAM) 203, a memory 204, a communication interface (I/F) 205, an operation I/F 206, and a display 207. Further, the hardware included in the user terminal 2 is connected to each other by, for example, a bus. The hardware of the user terminal 2 may be connected to another device or the like by wired or wireless communication.

The user terminal 2 is, for example, an information processing apparatus such as a personal computer (PC), a smartphone, or a tablet.

The communication I/F 205 implements the functions of the communication unit 2a and the like. For example, the communication I/F 205 is a connection terminal, a communication circuit, or the like.

The operation I/F 206 implements the functions of the input unit 2c and the like. For example, the operation I/F 206 is an input device such as a button, keyboard, dial, key, touch panel, and microphone.

The display 207 implements the functions of the display unit 2d. For example, the display 207 is an output device such as a liquid crystal panel, an organic electroluminescence (EL), and an inorganic EL. The display 207 and the operation I/F 206 may be integrated like a touch panel.

The memory 204 is an example of a main storage device. For example, the memory 204 stores information acquired through the communication network 4. The user terminal 2 may further include an auxiliary storage device such as a hard disk or a solid state drive (SSD).

The CPU 201 implements the functions of the device control unit 2b and the like. That is, the CPU 201 is an example of a control device and an arithmetic device. The ROM 202 is a storage device such as a non-volatile semiconductor.

The RAM 203 is a volatile semiconductor storage device or the like.

A program for implementing the device control unit 2b and the like is stored in advance in, for example, the ROM 202 or the memory 204. Then, the program is read by the CPU 201 from the ROM 202, the memory 204 or the like to the RAM 203 and expanded. Next, the CPU 201 executes instructions according to the program expanded in the RAM 203.

The program may be stored in, for example, an auxiliary storage device instead of the ROM 202 and the memory 204. Further, the program may be acquired through a wired network, a wireless network, broadcasting, or the like.

The device control unit 2b and the like may be implemented by an electronic circuit or a combination of a CPU to execute a program and a circuit.

Figure 4:
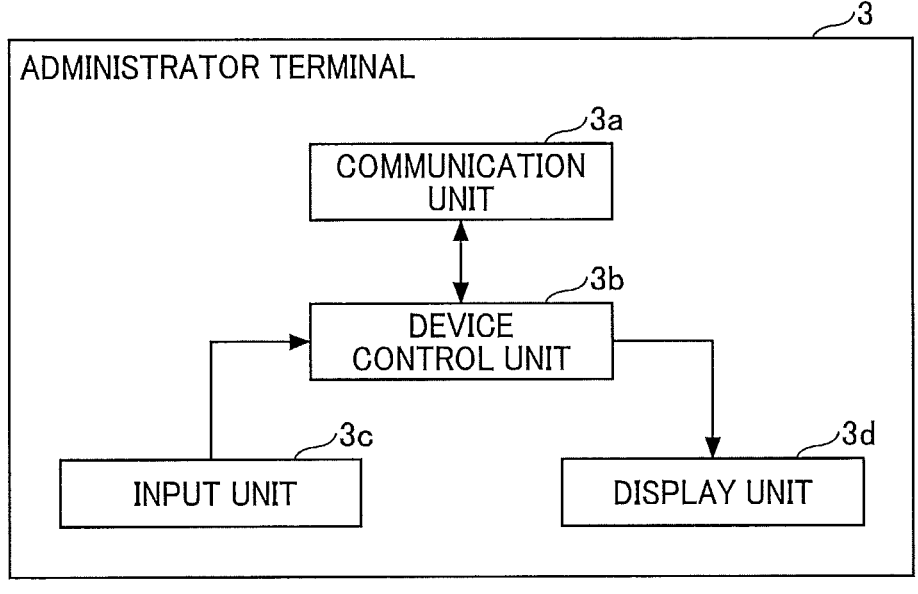
FIG. 4 is a block diagram illustrating an example of a functional configuration of an administrator terminal according to embodiments of the present disclosure.

FIG. 4 is a block diagram illustrating an example of a functional configuration of an administrator terminal. For example, like the user terminal 2, the administrator terminal 3 includes a communication unit 3a, a device control unit 3b, an input unit 3c, a display unit 3d, and the like. Hereinafter, an example in which the administrator terminal 3 has the same functional configuration as the user terminal 2 is described, and redundant description is omitted. However, the administrator terminal 3 may have a functional configuration different from the user terminal 2. A plurality of administrator terminals may be included in the information processing system.

Figure 5:
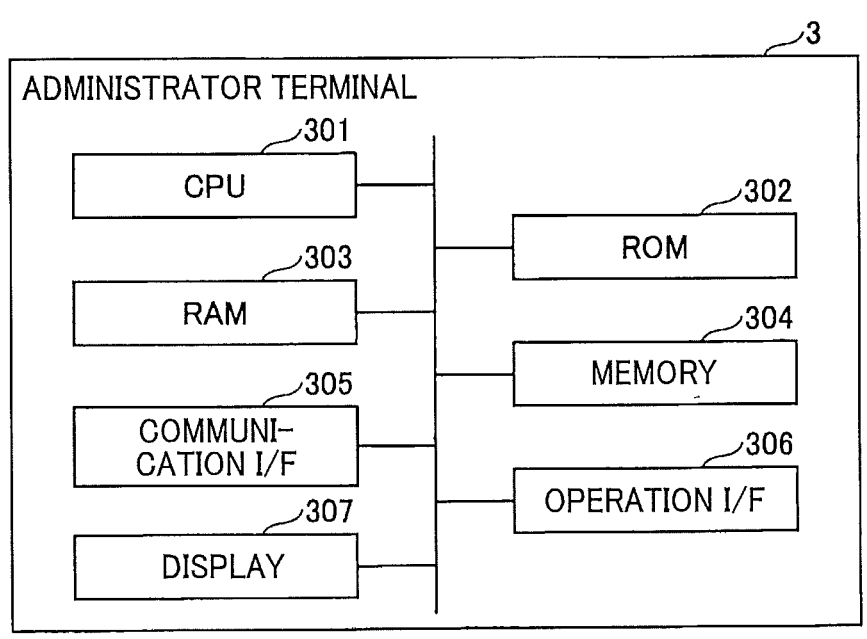
FIG. 5 is a block diagram illustrating an example of a hardware configuration of the administrator terminal according to embodiments of the present disclosure.

FIG. 5 is a block diagram illustrating an example of a hardware configuration of the administrator terminal according to embodiments of the present disclosure. For example, the administrator terminal 3 includes a CPU 301, a ROM 302, a RAM 303, a memory 304, a communication I/F 305, an operation I/F 306, and a display 307. Hereinafter, an example in which the administrator terminal 3 has the same hardware configuration as the user terminal 2 is described, and redundant description is omitted. However, the administrator terminal 3 may have a hardware configuration different from the user terminal 2.

Figure 6:
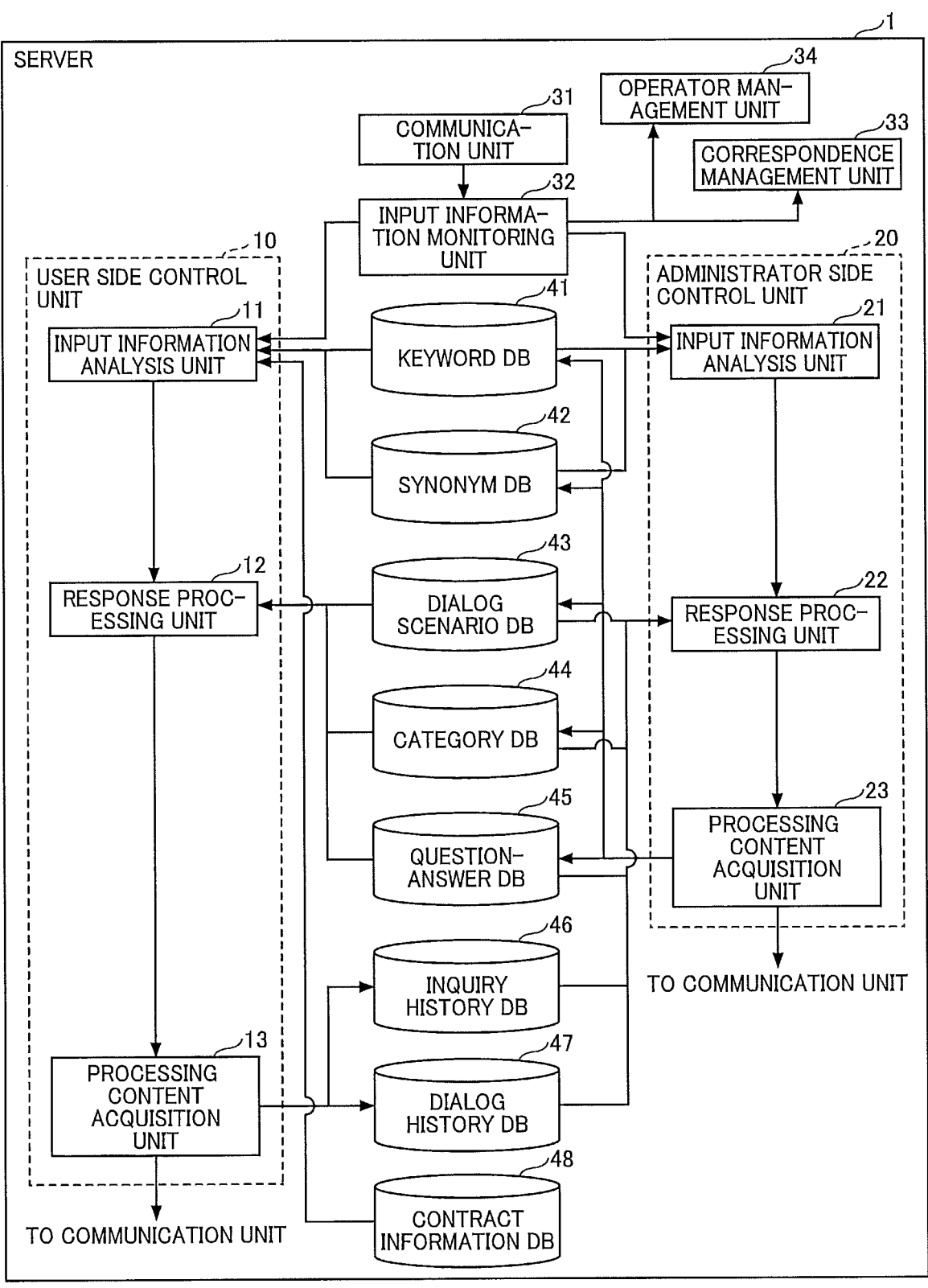
FIG. 6 is a block diagram illustrating an example of a functional configuration of a server according to embodiments of the present disclosure.

FIG. 6 is a block diagram illustrating an example of a functional configuration of the server. The server has various databases (DB). For example, the server 1 includes a communication unit 31, an input information monitoring unit 32, a correspondence management unit 33, an operator management unit 34, a user side control unit 10, an administrator side control unit 20, a keyword DB 41, a synonym DB 42, a dialog scenario DB 43, a category DB 44, a question-answer DB 45, an inquiry history DB 46, a dialog history DB 47, a contract information DB 48 and the like.

The DB may be included in an external device and referred to by the server 1 or the like. Further, a configuration of the DB does not have to be the configuration illustrated in the figure. That is, the DB does not have to have the name and the number as illustrated in the figure and may be any DB having the same content.

The communication unit 31 communicates with the external devices such as the user terminal 2 and the administrator terminal 3 through the communication network 4.

The input information monitoring unit 32 acquires various information and the like from the user terminal 2 and the administrator terminal 3 through the communication unit 31. For example, the input information monitoring unit 32 selects the acquired information and outputs to the user side control unit 10 or the administrator side control unit 20. Specifically, the input information monitoring unit 32 outputs information and the like acquired through the interactive application to the user side control unit 10. On the other hand, the input information monitoring unit 32 outputs information acquired through the management application to the administrator side control unit 20.

The correspondence management unit 33 stores and updates state of correspondence.

The operator management unit 34 stores and updates the state of correspondence of each operator.

The user side control unit 10 controls response of the server 1 to the user. For example, the user side control unit 10 outputs to the user terminal 2, information (hereinafter referred to as "response information") to be responded to information such as a question (hereinafter referred to as "input information") input by the user through the user terminal 2.

The administrator side control unit 20 controls the input and output of the server 1 with respect to an administrator. For example, the administrator side control unit 20 receives an operation, such as input to each DB, performed by the administrator from the administrator terminal 3. In addition, the administrator side control unit 20 outputs information indicated by each DB in response to a request from the administrator terminal 3.

The administrator side control unit 20 may control storage of information including inquiry information in the administrator side control unit 20 and answer information corresponding to the inquiry information and history information including history of input information and response information in the user side control unit 10.

The dialog scenario DB 43 stores dialog type scenario information corresponding to the input information. The user side control unit 10 is supposed to have a dialog with the user according to a scenario that is input in advance in the dialog scenario DB 43.

Figure 7B:
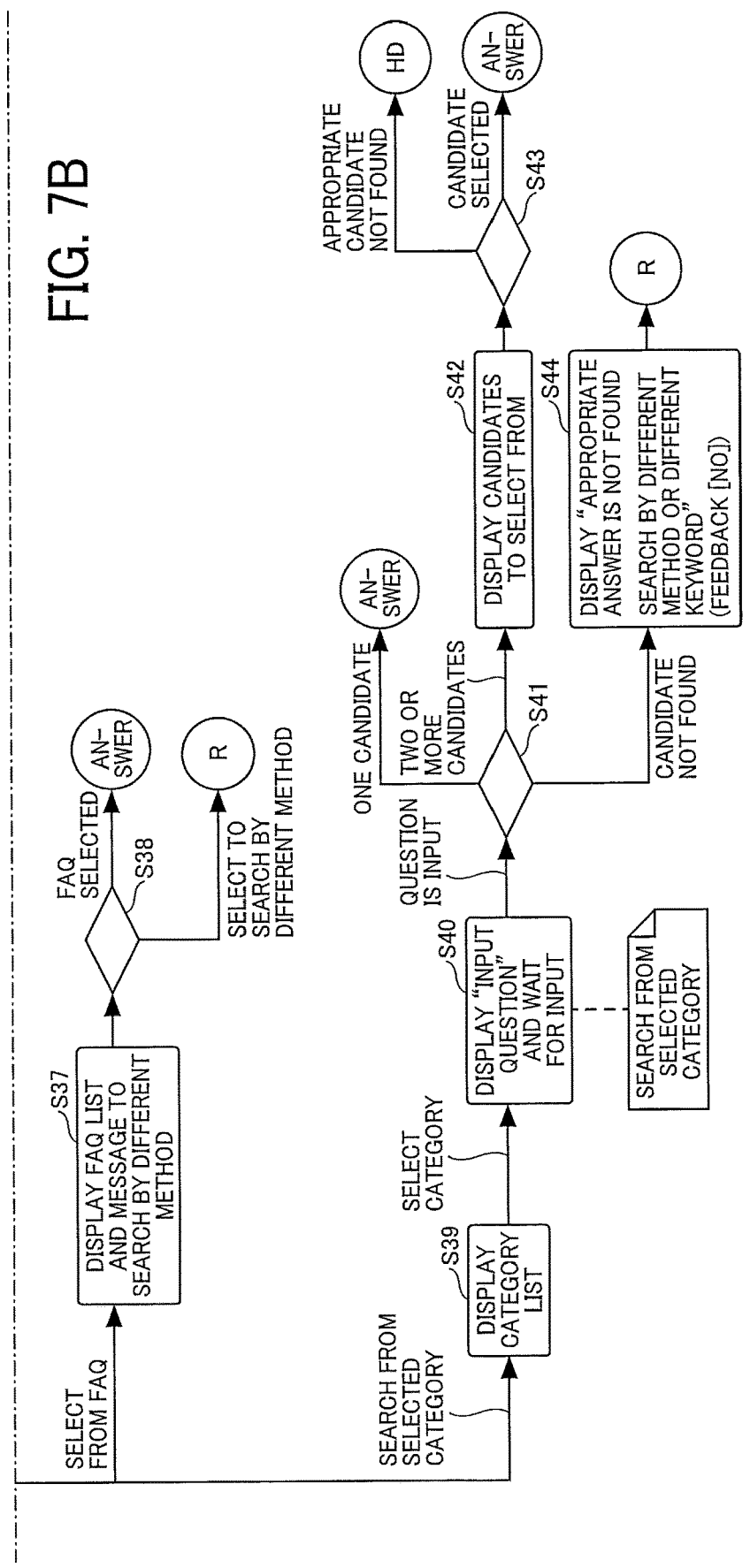

FIG. 7A and FIG. 7B illustrate an example of the scenario information according to the first embodiment. For example, a process to receive the input information from a user for asking a question and to output the response information that is an answer to the received question is performed according to a scenario as illustrated in FIG. 7A and FIG. 7B.

The category DB 44 stores category information for classifying questions.

FIG. 8 is a diagram illustrating an example of the category information. For example, as illustrated, the category information associates a character string of the name of a category including a question, an identifier (ID) of the category information, and an update date and time of the category information.

The question-answer DB 45 stores question-answer information including a question and an answer to the question. The question-answer information is created in advance and stored in the question-answer DB 45.

FIG. 9 is a diagram illustrating an example of the question-answer information. For example, as illustrated in the figure, the question-answer information includes a question, an ID of the question-answer information, a question similar to the question, an answer to the question, ID of a category including the question, and an updated date and time of the question-answer information.

The keyword DB 41 stores a keyword, that is a character example indicating the characteristics of the question and the answer included in the question-answer information. The keywords may be words, phrases and sentences. Further, the keyword DB 41 may store keywords not related to the question-answer information.

For example, the user side control unit 10 first decomposes the character string of the question input by the user into words. Next, the user side control unit 10 detects the keyword of the question by collating the decomposed word with the character string stored in the keyword DB 41. Further, the user side control unit 10 searches the question-answer information corresponding to the question indicated by the input information by collating the detected keyword with the character string of question in the question-answer DB 45.

The synonym DB 42 stores synonym information of keywords stored in the keyword DB 41. For example, the synonym information associates character strings having similar meanings with each other. The character string may be a word, a phrase, or a sentence. Further, the character strings having similar meanings are not limited to the character strings having similar meanings. For example, character strings that have similar meanings to each other may be a character string that can deduce the other from one, or one may be a character string that is a part of the other, scenes used may be similar, or definition may be fixed according to the usage environment.

The user side control unit 10 first decomposes the character string of the question input by the user into words. Next, the user side control unit 10 collates the decomposed words with information in the synonym DB 42 and extracts a character string that is a synonym of a decomposed word. In this way, the user side control unit 10 estimates a keyword by matching the word included in the question and a synonym of the word with the keyword DB 41.

The inquiry history DB 46 stores inquiry history information which is information on the history of questions input by the user.

FIG. 10 is a diagram illustrating an example of inquiry history information. For example, as illustrated in the figure, the inquiry history information includes an inquiry history information ID, an interactive session ID of a session containing the question, a category ID corresponding to the question-answer information, a question ID corresponding to the question-answer information, a question input by the user, user feedback information for answer to the question, and a date and time when the question was input, stored in association with each other.

A dialog session is a set of dialog performed between the user and the server 1. For example, the dialog included in the same dialog session is dialog performed on the user terminal 2 from the time the screen used for the dialog in the chat format or the like is opened to the time the dialog is closed, or dialog or the like performed from the time the screen was launched to the time the dialog was forcibly closed due to a session timeout. The session timeout occurs when there is no action on the user terminal 2 within a certain time set in advance. The session timeout is a process of ending the screen or the like used for the dialog.

The interactive session is not limited to the above description. For example, the dialog session may indicate a dialog between the user and the server 1 from the time a question by the user is input to the time a presentation of an answer to the question is given and user feedback to the answer is input. In the case described above, the interactive session is completed each time the user feedback is received.

The dialog history DB 47 stores dialog history information, which is history information of utterance contents input to the user terminal 2 and the utterance contents output from the server 1 in the dialog between the user and the server 1.

FIG. 11A and FIG. 11B are diagrams illustrating an example of dialog history information. For example, as illustrated in the figure, the dialog history information includes a dialog history information ID, a dialog session ID of a session in which the spoken message was transmitted, a speaker, a spoken message, a message type ID, a content ID of the message, and a date and time when the message was sent, stored in association with each other.

The message type ID indicates a type of message. Specifically, the message type IDs "5-0", "5-1" and "5-2" correspond to "category", "question-answer information" and "scenario", respectively. The content ID indicates content associated with the message type ID. For example, when the message type ID is a scenario, the content ID indicates a message set in the scenario. The content ID indicates the question-answer information ID when the message type is the question-answer information. The content ID refers to a message for selecting a category when the message type is the category.

Figure 12:
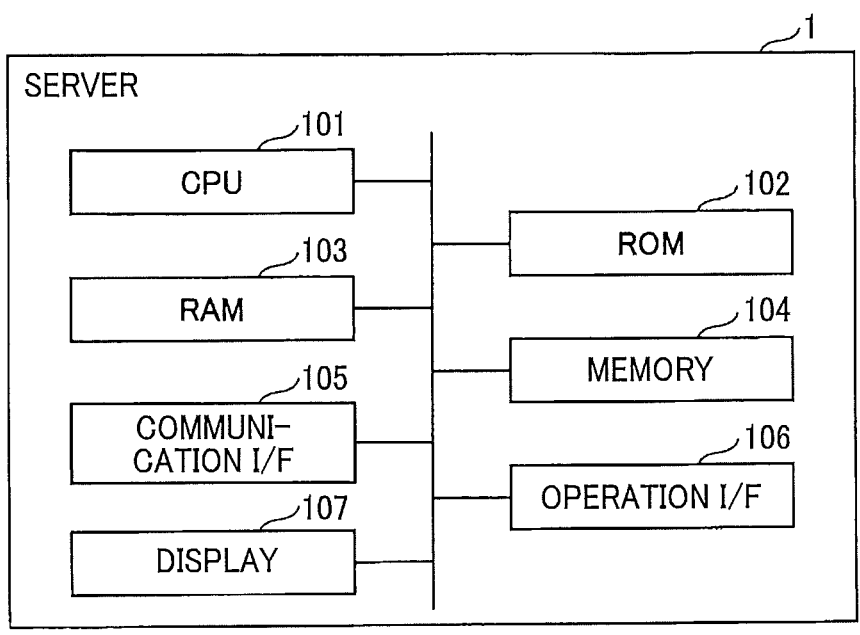
FIG. 12 is a block diagram illustrating an example of a hardware configuration of a server according to embodiments of the present disclosure.

FIG. 12 is a block diagram illustrating an example of a hardware configuration of the server. For example, the server 1 includes a CPU 101, a ROM 102, a RAM 103, a memory 104, a communication I/F 105, an operation I/F 106, a display 107, and the like. Hereinafter, an example in which the server 1 has the same hardware configuration as the user terminal 2 is described, and redundant description is omitted. However, the server 1 may have a hardware configuration different from the user terminal 2 or the like.

Further, the server 1 is a so-called cloud server, but is not limited to the cloud server.

For example, the chatbot system controls as illustrated in the figure based on the scenario information set in advance by the administrator and interacts with the user. For example, the scenario information, graphical user interface (GUI), etc. are set in advance so that communication is carried out in the flow illustrated in the figure such as FIGS. 7A and 7B.

In step S31, the user side control unit 10 causes the user terminal 2 to display a selection menu to select a question search method. For example, the selection menu includes three options such as "search from all categories", "search from a selected category", and "search from frequently asked questions (FAQ)". The selection menu may have four or more options or two or less options.

When "search from all categories" is selected in the selection menu, the scenario proceeds to step S32. When "search from FAQ" is selected in the selection menu, the scenario proceeds to step S37. When "search from a selected category" is selected in the selection menu, the scenario proceeds to step S39.

In step S32, the user side control unit 10 causes the user terminal 2 to display a message prompting input of a question. In response to the input of a question, the scenario proceeds to step S33.

In step S33, the user side control unit 10 analyzes the character string indicating the question. Then, the user side control unit 10 searches for an answer candidate for the question using the question-answer DB 45 or the like. Note that the user side control unit 10 searches the question-answer DB 45 by using the keywords included in the question, the keyword estimated from the synonyms, and the like, and thus a plurality of answer candidates may be acquired.

If the result of the search in step S33 is "one candidate", the user side control unit 10 sets the searched candidate as an answer and responds as response information. If the result of the search in step S33 is "two or more candidates", the user side control unit 10 proceeds to step S34. If the result of the search in step S33 is "candidate not found", the user side control unit 10 proceeds to step S36.

In step S34, that is, when there are two or more answer candidates, a message prompting the user to select any one of the plurality of candidates or none of the candidates is displayed on the user terminal 2.

In step S35, when a candidate is selected ("candidate selected" in the figure), the user side control unit 10 responds using the selected candidate. On the other hand, when the candidate is not selected ("appropriate candidate not found" in the figure), a message indicating that the answer to the question cannot be displayed at this stage is displayed on the user terminal 2.

In step S36, the user side control unit 10 causes the user terminal 2 to display a message of apology prompting a re-search, and the process returns to step S31.

In step S39, the user side control unit 10 causes the user terminal 2 to display a list of category names and the like. Then, when selection of a category from the list of category names is received, the user side control unit 10 proceeds to step S40.

In step S40, when the user designates a category, the user side control unit 10 causes the user terminal 2 to display a message prompting input of a question. When a question or the like is input, the input information is acquired from the user terminal 2, and the user side control unit 10 proceeds to step S41.

In step S41, in response to the input of a question by the user corresponding to the selected category, the user side control unit 10 searches the question-answer DB 45 or the like for the question-answer information corresponding to the selected category and extracts question-answer information corresponding to the question.

In step S41, if the search result indicates that there is one answer candidate ("one candidate" in the figure), the user side control unit 10 responds by using the searched answer as the response information. If the result of the search is that there are two or more candidates for the answer ("two or more candidates" in the figure), the user side control unit 10 proceeds to step S42. When the answer candidate is not extracted as a result of the search ("candidate not found" in the figure), the user side control unit 10 proceeds to step S44.

In step S42, the user side control unit 10 causes the user terminal 2 to display a message that prompts the user to select any of the answer candidates or none of the candidates.

In step S43, the user side control unit 10 replies using a selected candidate, if a candidate is selected in step S42. On the other hand, when candidate is not selected ("appropriate candidate not found" in the figure), a message indicating that the answer to the question cannot be displayed at this stage is displayed on the user terminal 2.

In step S44, if the answer candidate is not detected, the user side control unit 10 causes the user terminal 2 to display a message of apology prompting a re-search and the process returns to step S31.

In step S37, the user side control unit 10 refers to the inquiry history DB 46 and extracts one or more frequently asked questions (for example, three questions). The user side control unit 10 causes the user terminal 2 to display the extracted frequently asked questions. Note that the user side control unit 10 may also display a message asking for selection of another search method on the user terminal 2.

In step S38, in response to a selection of a question from the list of questions in step S37, the user side control unit 10 reads the answer to the selected question from the question-answer DB 45 and displays the answer on the user terminal 2. On the other hand, when another search method is selected, the user side control unit 10 returns to step S31.

Hereinafter, an example of a functional configuration of the user side control unit 10 is described. For example, the input information analysis unit 11 analyzes the input information acquired from the user terminal 2 and outputs the analysis result to the response processing unit 12.

Specifically, the input information analysis unit 11 first analyzes the character string input by the user. For example, the input information analysis unit 11 performs morphological analysis to decompose the character string of the question and extract words. Further, the input information analysis unit 11 refers to the synonym DB 42 and extracts synonyms of the extracted words. Next, the input information analysis unit 11 compares the extracted words and synonyms with the keyword DB 41 to estimate the keywords.

The response processing unit 12 generates response information for the input information. For example, the response processing unit 12 generates information selected on the display screen of the display unit 2d included in the user terminal 2 and response information for the character string input to the user terminal 2.

For example, when an option included in the scenario information is selected, the response processing unit 12 refers to the dialog scenario DB 43 and outputs a message corresponding to the option to the user terminal 2. When the character string of the question is input, the response processing unit 12 collates the keyword estimated by the input information analysis unit 11 with the question-answer DB 45 to search the question-answer information for the question. Then, the response processing unit 12 outputs the searched question-answer information to the user terminal 2. For example, when the option included in the category information is selected, the response processing unit 12 may limit the search of the question-answer information in the question-answer DB 45 to the selected category.

The processing content acquisition unit 13 acquires and stores the processing result of the response processing unit 12. For example, the processing content acquisition unit 13 stores the answer to the question in the inquiry history DB 46 as inquiry history information. Further, the processing content acquisition unit 13 stores the content of the utterance input and output between the server 1 and the user terminal 2, which is the process of answering the question, in the dialog history DB 47 as the dialog history information.

Hereinafter, a functional configuration of the administrator side control unit 20 is described. For example, the input information analysis unit 21 analyzes information and the like input to the administrator terminal 3, and outputs the analyzed information to the response processing unit 22. Specifically, the input information analysis unit 21 analyzes a character string or the like input by the administrator or the like. For example, the input information analysis unit 21 extracts words and estimates keywords corresponding to the words and synonyms, as in the user side control unit 10.

For example, the response processing unit 22 changes, adds, or deletes information for each DB according to a command input by the administrator or the like. Specifically, the response processing unit 22 changes the keyword, deletes the keyword, or adds a new keyword to the keyword stored in the keyword DB 41 or the like. Similarly, the response processing unit 22 changes the synonym, deletes the synonym, or adds new synonyms to the synonyms stored in the synonym DB 42 and the like. Furthermore, the response processing unit 22 changes the scenario, deletes the scenario, or adds a new scenario to the scenario information stored in the dialog scenario DB 43. Furthermore, the response processing unit 22 changes the category, deletes the category, or adds a new category to the category information stored in the category DB 44. Further, the response processing unit 22 edits the question-answer information, deletes the question-answer information, or adds new question-answer information to the question-answer information stored in the question-answer DB 45. Hereinafter, "change, addition and deletion of information" may be referred to as "editing" of information.

In addition, for example, the response processing unit 22 may display the feedback statistics of the user on the display unit 3d according to a command input from the administrator or the like. For example, the user's feedback indicates the user's rating entered for the answer. For example, when the user side control unit 10 of the server 1 presents an answer to the user's question, the user is asked, in a dialog with the sever, whether the question is solved by the answer. That is, the user side control unit 10 asks the user whether the user is satisfied with the answer. The response processing unit 22 presents degree of satisfaction with respect to the question as feedback statistics.

The configuration of the administrator side control unit may be such that there are functions and terminals for the administrator as described above. On the other hand, the administrator terminal may also serve as an operator terminal, for example. Hereinafter, a case where the operator terminal also serves as the administrator terminal is described as an example.

Figure 13:
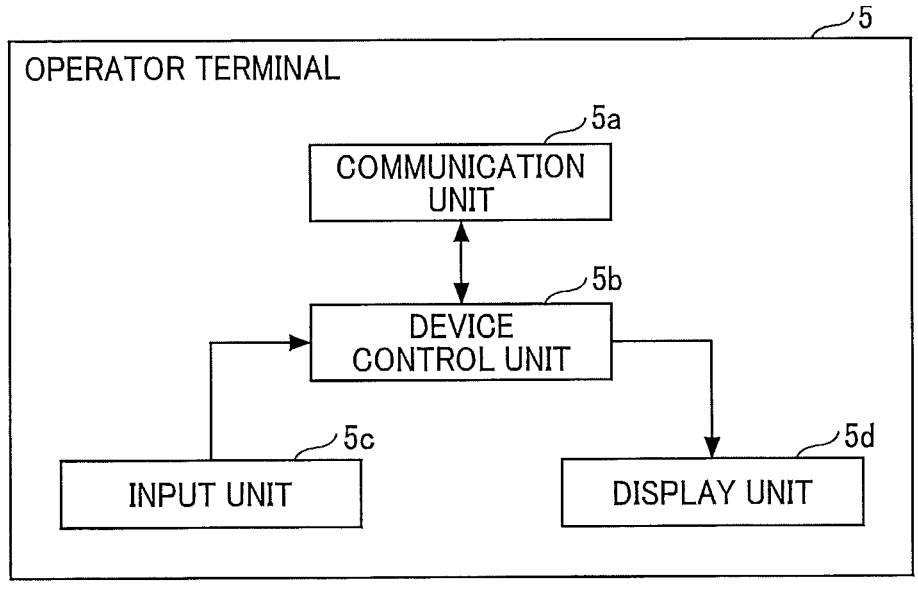
FIG. 13 is a block diagram illustrating an example of a functional configuration of an operator terminal according to embodiments of the present disclosure.

FIG. 13 is a block diagram illustrating an example of a functional configuration of an operator terminal. For example, like the user terminal 2, the operator terminal 5 includes a communication unit 5a, a device control unit 5b, an input unit 5c, a display unit 5d, and the like. Hereinafter, an example in which the operator terminal 5 has the same functional configuration as the user terminal 2 is described, and redundant description is omitted. However, the operator terminal 5 may have a functional configuration different from the user terminal 2.

Figure 14:
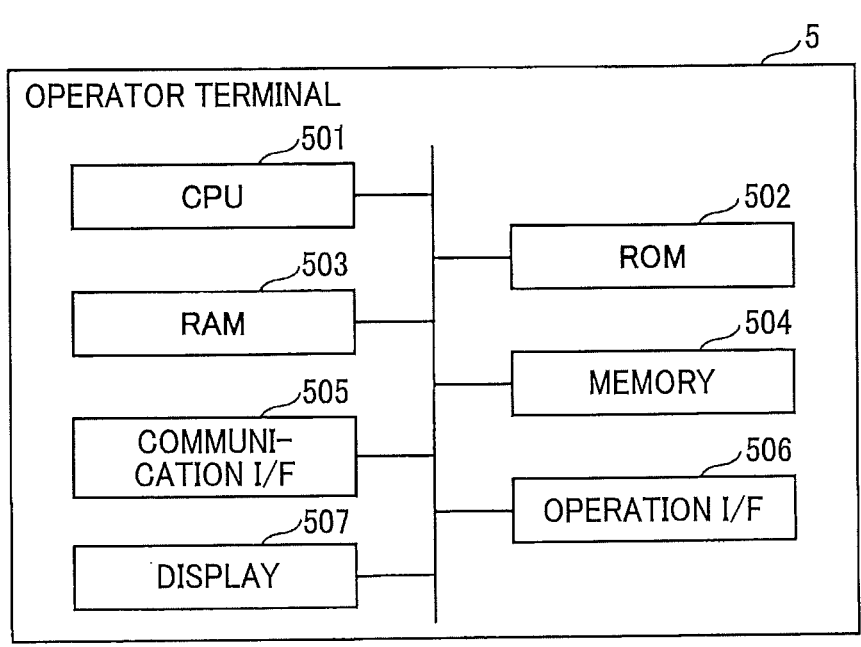
FIG. 14 is a block diagram illustrating an example of a hardware configuration of an operator terminal according to embodiments of the present disclosure.

FIG. 14 is a block diagram illustrating an example of a hardware configuration of the operator terminal. For example, the operator terminal 5 includes a CPU 501, a ROM 502, a RAM 503, a memory 504, a communication I/F 505, an operation I/F 506, a display 507, and the like. Hereinafter, an example in which the operator terminal 5 has the same hardware configuration as the user terminal 2 and the like is described, and redundant description is omitted. However, the operator terminal 5 may have a hardware configuration different from the user terminal 2 and the like.

Figure 15:
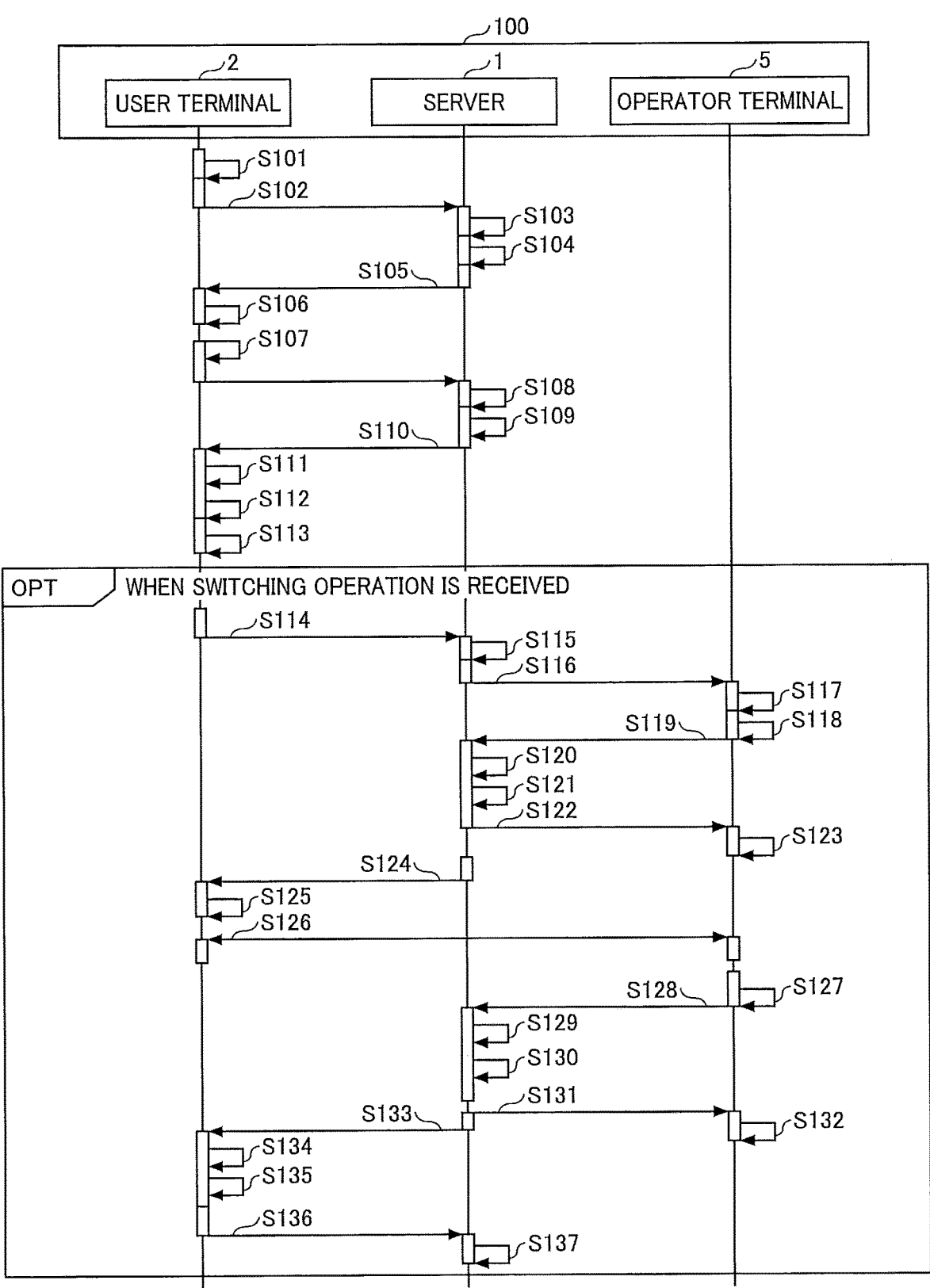
FIG. 15 is a sequence diagram illustrating an example of overall processing according to embodiments of the present disclosure.

FIG. 15 is a sequence diagram illustrating an example of overall processing. Hereinafter, a case where the server 1 independently performs the processing for implementing the chatbot service is described as an example.

In step S101, the input unit 2c of the user terminal 2 receives an operation to activate a chatbot. For example, the user terminal 2 receives pressing of a certain icon included in the web page displayed on the display unit 2d, an operation to start the interactive application installed in the user terminal 2 or pressing of a certain button of the interactive application.

In step S102, the user terminal 2 requests the activation of the chatbot in response to the operation to activate the chatbot. The communication unit 2a of the user terminal 2 transmits a chatbot activation request and a tenant ID for identifying a chatbot contractor (tenant) to the server 1.

The tenant ID is information that the user terminal 2 holds in advance, and may be included in, for example, the web page displayed on the browser that includes the icon for activating the chatbot, or a particular application that has a chat function.

In step S103, the server 1 acquires from the contract information DB 48, information such as a contract corresponding to the tenant ID received from the user terminal 2. For example, information such as whether or not to perform manned support and a period for which the support is provided is input to the contract in advance. Further, the memory 104 of the server 1 holds the acquired information such as the contract in association with the session ID and the like.

In step S104, the correspondence management unit 33 of the server 1 sets the correspondence state to "bot responding".

In step S105, the response processing unit 12 of the server 1 transmits the scenario information.

In step S106, the device control unit 2b of the user terminal 2 displays the scenario on the display unit 2d based on the scenario information.

In step S107, the input unit 2c of the user terminal 2 receives input information such as a question. The communication unit 2a of the user terminal 2 transmits the input information such as the received question to the server 1 and the input information monitoring unit 32 of the server 1 acquires the input information from the user terminal.

The input information may be information indicating the result of inputting a question character string in free format, or information indicating the result of input in a selection format in which an option prepared in advance in the scenario information or the like is selected.

In step S108, the response processing unit 12 of the server 1 searches the response information for the input information.

In step S109, the response processing unit 12 of the server 1 determines the item to be displayed on the user terminal 2. Specifically, the response processing unit 12 of the server 1 determines whether or not to display a switching display for switching to chat between the user and the operator. For example, the server 1 makes the following determination.

Figure 16:
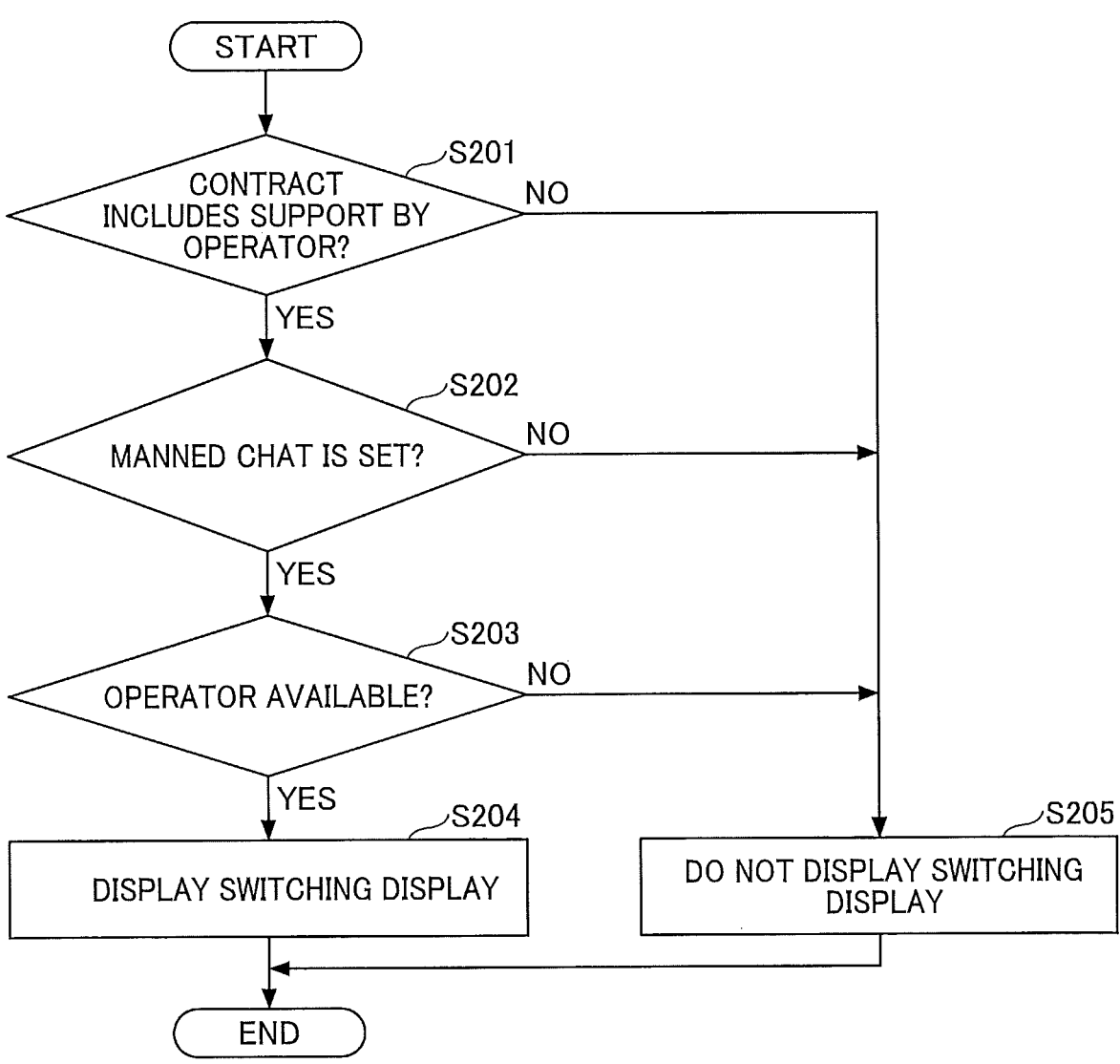
FIG. 16 is a flow chart illustrating an example of a determination process of switching display according to embodiments of the present disclosure.

FIG. 16 is a flow chart illustrating an example of a determination process of the switching display. For example, three determinations of step S201, step S202, and step S203 are performed to determine whether to display the switching display (step S204) or not to display the switching display (step S205).

Depending on the result of the determination, for example, the screen on the user terminal differs as follows.

Figure 17:
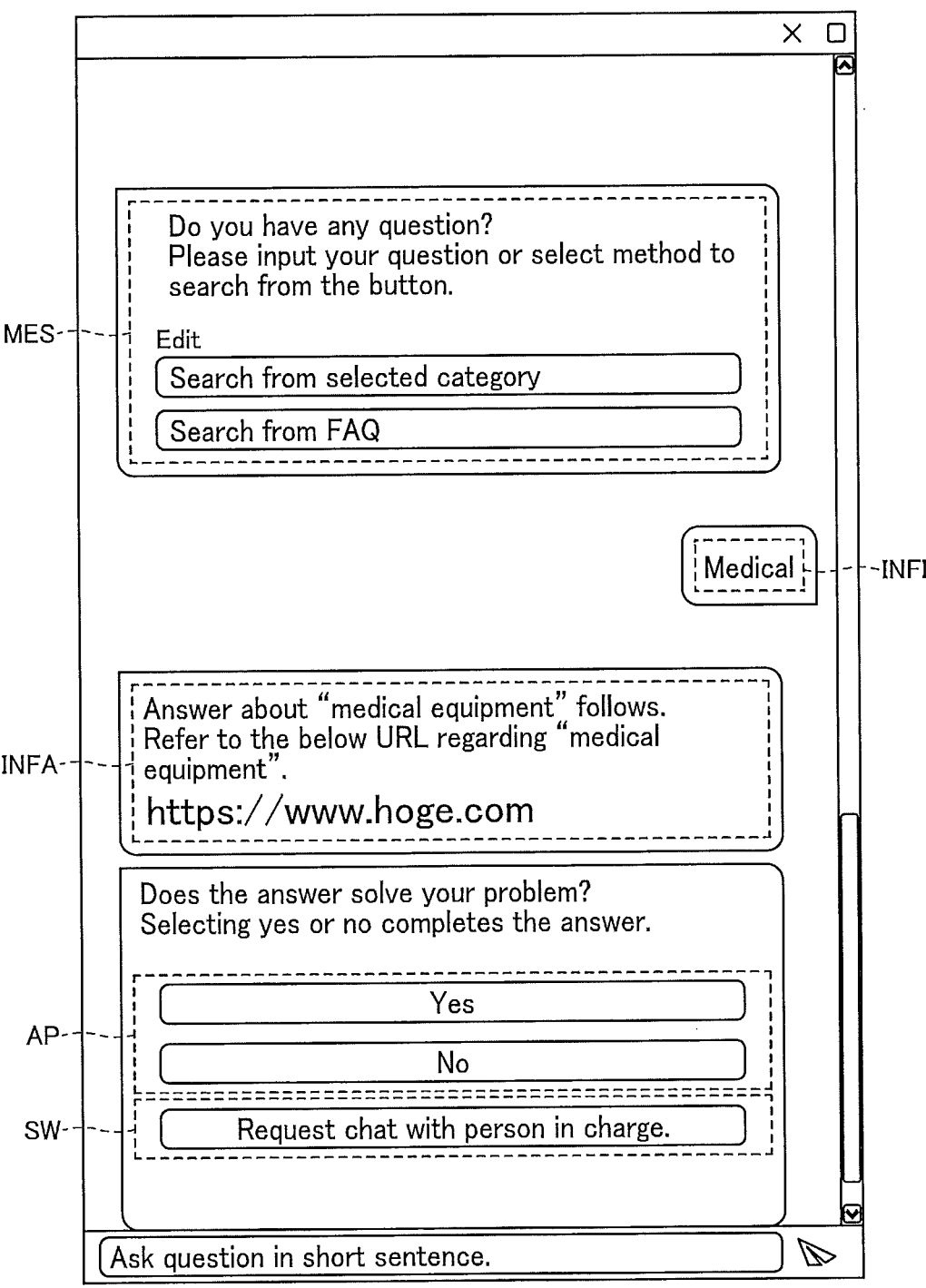
FIG. 17 is a diagram illustrating an example of a screen displaying a switching display according to embodiments of the present disclosure.

FIG. 17 is a diagram illustrating an example of a screen displaying the switching display. If it is determined in step S204 to display the switching display, for example, when an evaluation reception screen to receive evaluation as illustrated in the figure is displayed, a switching reception screen to receive switching to a manned support is displayed.

In step S106, a message MES is displayed based on a scenario or the like, and the chatbot service is started.

In step S107, the input information INFI, which is a character string or the like indicating content that the user wants to ask, is input, such as "medical".

In step S110 described later, the response information INFA is returned to the input information INFI. In this example, the response information INFA is information of a uniform resource locator (URL) of a reference homepage.

Note that such input information INFI and response information INFA may be exchanged a plurality of times.

Then, a button for evaluation (hereinafter referred to as "bot evaluation button AP1") is displayed on the screen. Further, on the screen, a button (hereinafter, referred to as "manned support switching button SW") for switching to chat between the user terminal and the operator terminal is displayed.

The screen receives either one of the evaluation operation and the switching operation.

Figure 18:
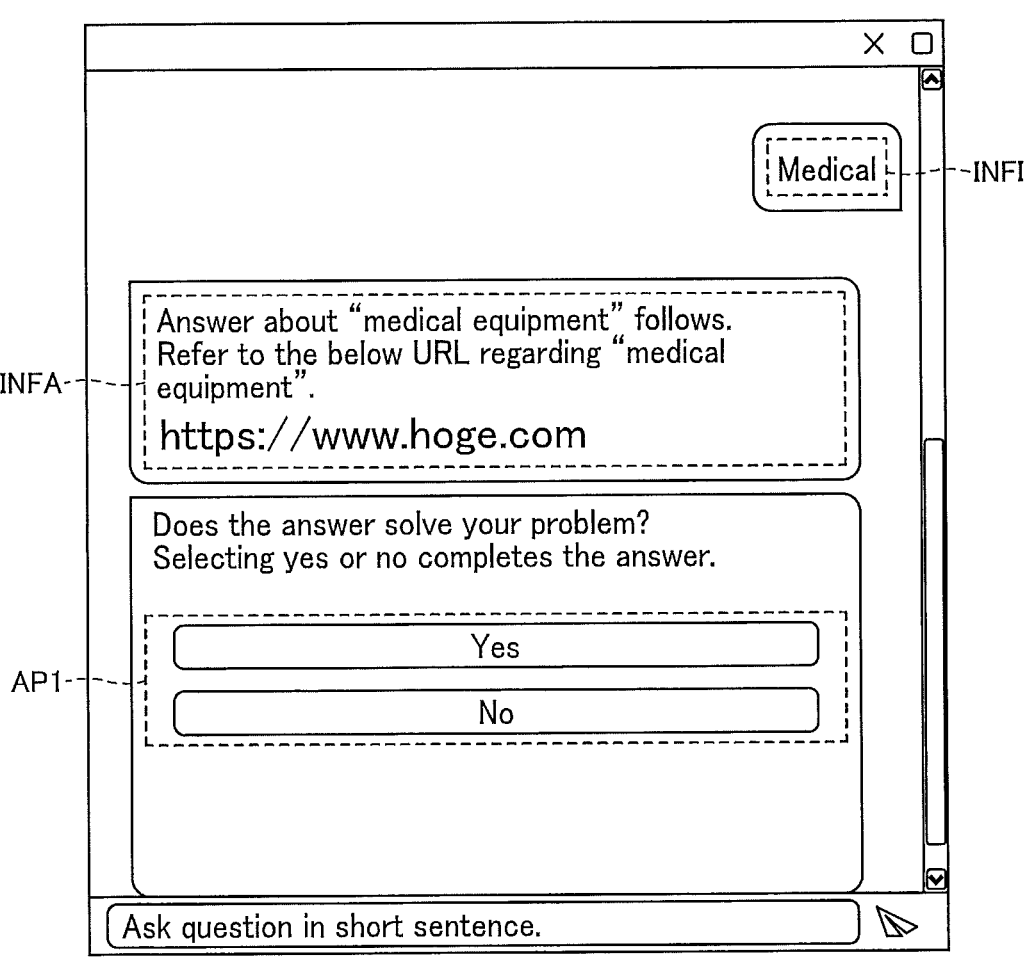
FIG. 18 is a diagram illustrating an example of a screen on which a switching display is not displayed according to embodiments of the present disclosure.

FIG. 18 is a diagram illustrating an example of a screen on which the switching display is not displayed. When it is determined that the switching display is not displayed in step S205, for example, the following screen is displayed. Compared to FIG. 17, FIG. 18 is different in that there is no manned support switching button SW.

That is, when the switching display is not displayed, the interaction between the bot and the user ends when the pressing of the bot evaluation button AP1 is received.

The server 1 determines whether or not to display the switching display, for example, as described below.

In step S201, the server 1 determines whether or not the contract includes support by operator. That is, the response processing unit 12 of the server 1 determines whether or not the user has a contract for manned support based on the contract information. Further, the contract information and the like are input in advance to the server 1.

When it is determined that the contract includes support by operator (YES in step S201), the server 1 proceeds to step S202. On the other hand, when it is determined that the contract does not include support by operator (NO in step S201), the server 1 proceeds to step S205.

In step S202, the response processing unit 12 of the server 1 determines whether "manned chat" is set to "ON". It is desired that whether or not to perform manned support is set on the following setting screen or the like, for example.

Figure 19:
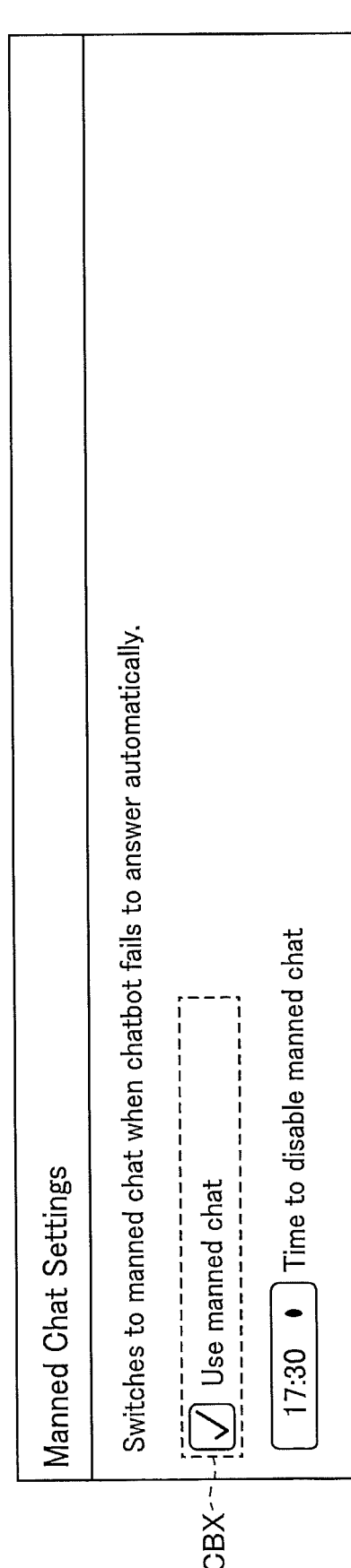
FIG. 19 is a diagram illustrating an example of a setting screen for a manned support according to embodiments of the present disclosure.

FIG. 19 is a diagram illustrating an example of a setting screen for the manned support. For example, the settings are performed by a GUI such as a check box CBX as illustrated in FIG. 19.

Specifically, when the check box CBX is set to "ON" for the item "Use manned chat", the server 1 determines that the "manned chat" is set to "ON" (YES in step S202).

Note that the settings as to whether or not to perform manned support is not limited to input by the check box CBX. For example, the settings of whether to perform manned support may be made by inputting time and the like. The end time or the like for the manned support may be set, such as "17:30" as illustrated in the FIG. 19. With such settings, the server 1 determines that "Use manned chat" is not "ON" after 17:30 (NO in step S202). Further, conditions other than the time may be set.

When it is determined that "Use manned chat" is set to "ON" (YES in step S202), the server 1 proceeds to step S203. On the other hand, when it is determined that "Use manned chat" is not set to "ON" (NO in step S202), the server 1 proceeds to step S205.

In step S203, the server 1 determines whether or not there is an operator available. When there are a plurality of operators, the server 1 determines that there is an operator available even if only one operator is available (YES in step S203).

Whether the operator is available, not available, or occupied is set by, for example, the following operation screen displayed on the operator terminal.

FIG. 20 is a diagram illustrating an example of the operation screen displayed by the operator terminal. For example, whether the operator is available, not available, or occupied is received by a GUI such as a button (hereinafter, referred to as "state switch SET") capable of displaying and inputting an availability of the operator.

The state switch SET may be set to "available", "not available", or "occupied" by the operator's operation. On the other hand, the operator terminal may set to "occupied" or the like based on the operator inputting a character string corresponding to another user.

In addition, for example, when the operator is away from the operator's seat, the state switch SET may be set to "not available" or the like based on the fact that no input is made to the sensor or the operator terminal for a certain period.

On the other hand, depending on the operator, there are cases where a plurality of users can be handled at the same time with, even if the operator's state is "occupied". Therefore, the operator may be able to set to "available" even if the operator is "occupied".

When the above settings are made, for example, the following setting process is performed.

Figure 21:
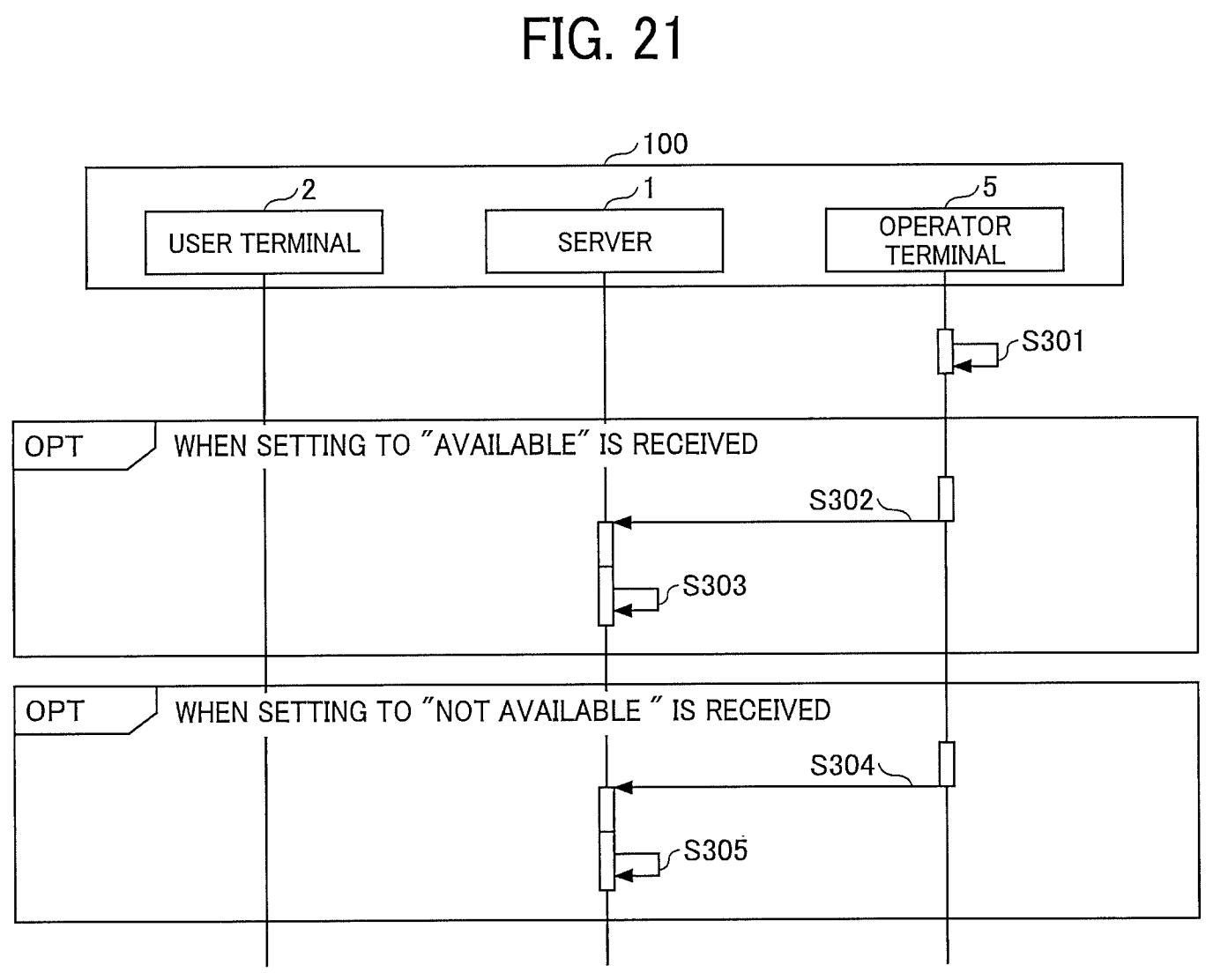

FIG. 21 is a diagram illustrating an example of the setting process for manned support.

In step S301, the operator terminal 5 receives the operation of the state switch SET.

When the state switch SET is set to "available" (in the figure, "when setting to "available" is received"), the operator terminal 5 proceeds to step S302. When the state switch SET is set to "not available" (in the figure, "when setting to "not available" is received"), the operator terminal 5 proceeds to step S304.

In step S302, the operator terminal 5 makes a request to change the state of the operator to "available" in response to the operation of the operator. Specifically, the device control unit 5b of the operator terminal 5 transmits a request to change the state of the operator to the server 1 through the communication unit 2a.

In step S303, the operator management unit 34 of the server 1 changes the state of the operator to "available" based on the request.

In step S304, the operator terminal 5 makes a request for changing the operator's state to "not available" in response to the operator's operation. Specifically, the device control unit 5b of the operator terminal 5 transmits a request to change the state of the operator to the server 1 through the communication unit 2a.

In step S305, the operator management unit 34 of the server 1 changes the state of the operator to "not available" based on the request.

Further, the operator terminal 5 stores the operator identification information for identifying the operator, which is input when the operator logs in to the operation screen, and the operator identification information is sent to the server 1 together with the request to change the state of the operator. Based on the request, the operator management unit 34 of the server 1 changes the state of the operator corresponding to the operator identification information to "available".

Figure 23:
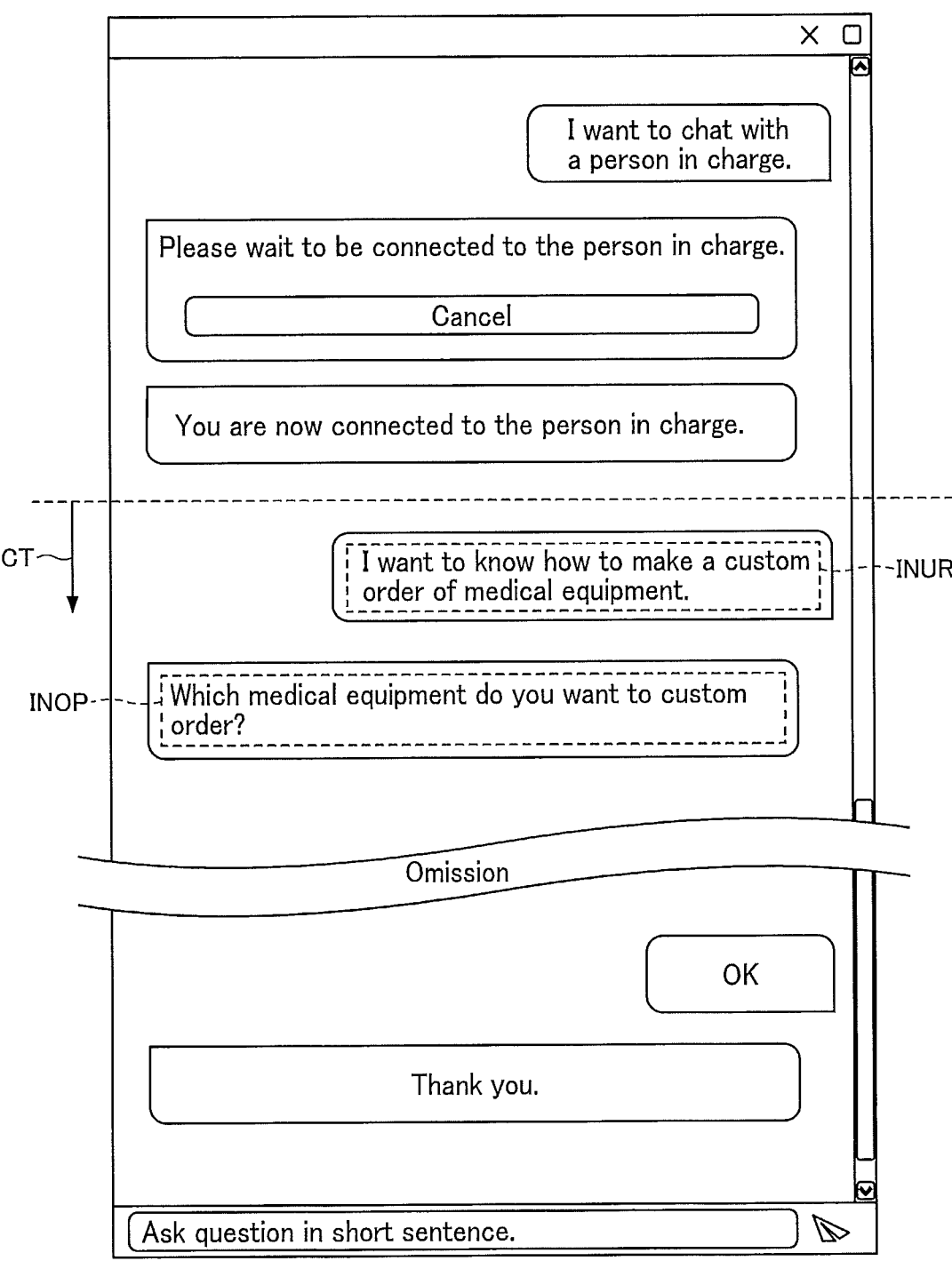
FIG. 23 is a diagram illustrating an example of the screen displaying switching to the manned support according to embodiments of the present disclosure.

In addition, a list of calling information is displayed on the operation screen. The calling information includes category information of question-answer information that the bot used to answer the last user (hereinafter referred to as "INFC") and input information such as questions entered by the user corresponding to the answer (hereinafter referred to as "immediately preceding input information INFQ"). By referring to these pieces of information, the operator knows which answer from the bot the user wants to interact with. When the operator selects the calling information that the operator wants to respond to, the screen of FIG. 25, which is described below, is displayed, and the operator handles the selected call. In addition, in response to the operator selecting the calling information, the state of the operator is changed to "occupied" and the selected calling information is moved to a column indicating "chat being handled" as illustrated in FIG. 23 described below. Further, the operator can also respond to a call by pressing the "calling operator" button displayed in the navigation menu on the left side of the operation screen.

Note that the operation screen displays a list of call information being handled by other operators and chats being handled by the bot.

When it is determined that the operator is available (YES in step S203), the server 1 proceeds to step S204. On the other hand, when it is determined that no operator is available (NO in step S203), the server 1 proceeds to step S205.

In step S204, the response processing unit 12 of the server 1 determines to display the switching display.

In step S205, the response processing unit 12 of the server 1 determines not to display the switching display.

For example, step S109 is performed as described above.

In step S110, the response processing unit 12 of the server 1 transmits, to the user terminal 2, response information and information of items to be displayed on the screen for performing the evaluation operation and the like. If it is determined that the switching display is to be displayed based on the determination result made in step S109, the display request of the manned support switching button SW is transmitted to the user terminal 2. On the other hand, if it is determined not to display the switching display, the display request for the manned support switching button SW is not transmitted to the user terminal 2. Further, instead of transmitting/not transmitting the display request, a display/non-display request may be transmitted to the user terminal.

In step S111, the display unit 2*d* of the user terminal 2 displays the response information received from the server 1.

In step S112, the display unit 2*d* of the user terminal 2 displays, for example, the bot evaluation button AP1 and the manned support switching button SW as illustrated in FIG. 17. When the display request of the manned support switching button SW is received from the server 1, the manned support switching button SW is displayed, and when the display request of the manned support switching button SW is not received, the manned support switching button SW is not displayed.

In step S113, when the manned support switching button SW is displayed, the input unit 2*c* of the user terminal 2 receives pressing of the manned support switching button SW. When pressing of the switch is received (in the figure, "when switching operation is received"), the user terminal 2 proceeds to step S114.

In step S114, the communication unit 2*a* of the user terminal 2 requests the server 1 for manned support.

In step S115, the correspondence management unit 33 of the server 1 sets the "waiting for manned support" state in response to a request from the user terminal 2.

In step S116, the communication unit 31 of the server 1 calls an operator. For example, a screen as illustrated in FIG. 20 is displayed on the operator terminal 5.

In step S117, the input unit 5*c* of the operator terminal 5 receives an operation for starting manned support.

In step S118, the display unit 5*d* of the operator terminal 5 displays a screen for chat when manned support starts.

When manned support is started as described above, for example, the following screen is displayed on the operator terminal 5.

FIG. 22 is a diagram illustrating an example of the operation screen during the manned support. Compared with the screen illustrated in FIG. 20, difference is that the chat is indicated in "chat being handled" field. As described above, the screen is switched to "manned support".

In step S119, the communication unit 5*a* of the operator terminal 5 notifies the start of manned support.

In step S120, the correspondence management unit 33 of the server 1 sets the correspondence state to "manned support".

In step S121, the operator management unit 34 of the server 1 sets the state of the operator to "occupied".

In step S122, the communication unit 31 of the server 1 notifies the operator of the state.

In step S123, the device control unit 5*b* of the operator terminal 5 sets the state of the operator to "occupied".

In step S124, the communication unit 31 of the server 1 notifies the start of the manned support.

In step S125, the display unit 2*d* of the user terminal 2 displays a screen for chat with the operator.

In step S126, the communication unit 2*a* of the user terminal 2 and the communication unit 5*a* of the operator terminal 5 send and receive the chat information input by the user or the operator through the server 1 to perform chat between the user and the operator.

When the manned support is performed as described above, the support is switched from the chatbot support to the chat with the operator as described below.

FIG. 23 is a diagram illustrating an example of switching to manned support. For example, the chat CT performed in step S126 is implemented by exchanging user input (hereinafter referred to as "user input INUR") and operator input (hereinafter referred to as "operator input INOP") as illustrated in FIG. 23.

The user input INUR is a question or the like input at the user terminal.

The operator input INOP is a response input at the operator terminal in response to the question.

As described above, the manned chat CT is performed.

In addition, when the chat CT ends, an evaluation for manned support may be received separately from the evaluation of the chatbot. For example, the following screen is used to accept the evaluation of manned support.

Figure 24:
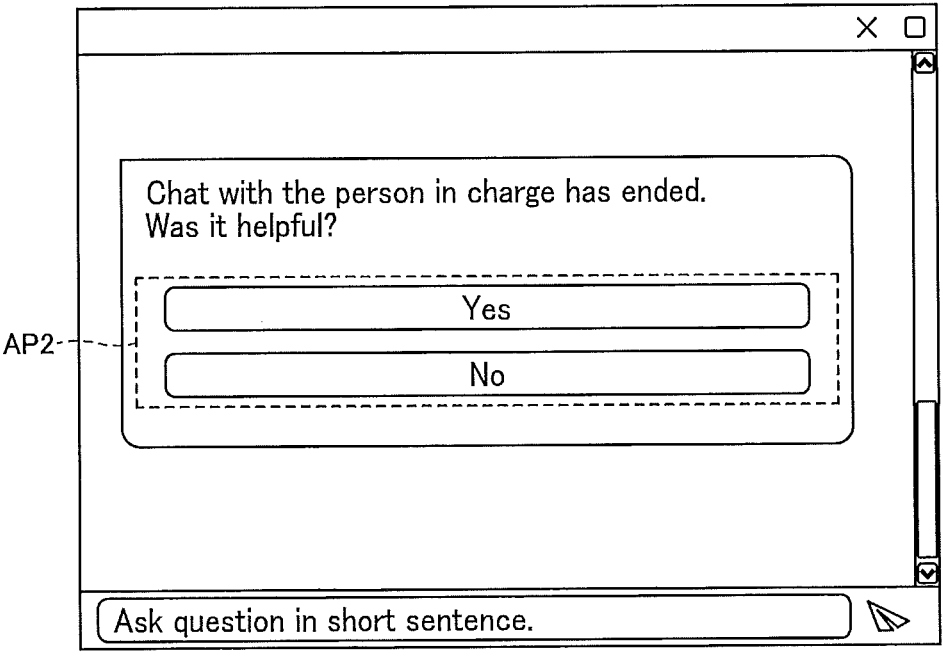
FIG. 24 is a diagram illustrating an example of the screen for accepting an evaluation for the manned support according to embodiments of the present disclosure.

FIG. 24 is a diagram illustrating an example of a screen for accepting an evaluation operation for manned support. For example, on the screen, a button (hereinafter referred to as "manned support evaluation button AP2") for inputting the evaluation for manned support is displayed. As described above, the customer satisfaction level and the like may be evaluated separately from the bot by using the manned support evaluation button AP2 and the like.

In step S127, the input unit 5*c* of the operator terminal 5 receives an operation for ending the manned support. Specifically, pressing of the "end conversation" button displayed in FIG. 25 described below is received. In addition, the manned support may be terminated when conversation is not exchanged within a certain time.

In step S128, the communication unit 5a of the operator terminal 5 notifies the end of manned support.

Note that the operator terminal 5 displays, for example, the following screen during manned support.

FIG. 25 is a diagram illustrating an example of a screen displayed by the operator terminal during the manned support. For example, the operator terminal 5 may display a correspondence history with the bot (hereinafter referred to as "bot correspondence history INFB") and the like.

The bot correspondence history INFB indicates response information and the like that the bot responded to before switching to the manned support. With such a bot correspondence history INFB, the operator can grasp what kind of response the bot has made.

The manned support is performed on a manned support screen INFH or the like. As described above, if the manned support is provided, detailed support is provided, and user satisfaction is increased.

In step S129, the correspondence management unit 33 of the server 1 sets the correspondence state to "completed" when the chat between the user and the operator ends.

In step S130, the operator management unit 34 of the server 1 sets the state of the operator to "available".

In step S131, the communication unit 31 of the server 1 notifies the operator of the state.

In step S132, the device control unit 5b of the operator terminal 5 sets the state of the operator to "available".

In step S133, the communication unit 31 of the server 1 transmits an evaluation item for the manned support.

In step S134, the display unit 2d of the user terminal 2 displays a screen as illustrated in FIG. 24, for example.

In step S135, the input unit 2c of the user terminal 2 receives the evaluation of the manned support.

In step S136, the communication unit 2a of the user terminal 2 transmits the evaluation information.

In step S137, the processing content acquisition unit 13 of the server 1 stores the history of evaluation information and the like.

The server 1 manages the operator's state and the like as described in the following Table 1.

TABLE 1

| Tenant ID = user0001 | |
| --- | --- |
| Operator ID | State |
| Operator A | Occupied |
| Operator B | Available |
| Operator C | Not Available |
| . . . | . . . |

In the above Table 1, the "operator ID" is an identification for identifying an operator. "State" indicates the state of the operator.

Also, the server 1 stores, for example, the following data described in Table 2.

TABLE 2

| Session ID | State | Operator | Start Date and Time | First Question | Category | History |
| --- | --- | --- | --- | --- | --- | --- |
| aaaa0001 | Manned support | Operator A | Aug. 21, 2019 09:35:12.465 | Medical | Product information | |
| aaaa0002 | Bot responding | | Aug. 21, 2019 09:39:23.332 | | | |
| aaaa0003 | Waiting for manned support | | Aug. 21, 2019 09:51:55.843 | | | |

"Session ID is an ID for identifying a chat or the like.
"State" indicates a state of a correspondence.
The "operator" inidcates a corresponding operator when manned support is being performed.
The "start date and time" indicates the date and time when the correspondence by chat or the like was started.
The "first question" is the input information or the like that was input first.
The "response category" is a category classified based on input information and the like.
"History" indicates history of chats and the like. For example, the history is stored as follows in the JavaScript (registed trademark) Object Notation (JSON) format.

FIG. 26 is a diagram illustrating an example of the history.

The "enterer" indicates a subject who has issued a question or the like. In this case, the "enterer" is a "user", a "bot", or an "operator".

The "chat content" is the question entered, the answer displayed, and the like.

The "date and time" is the date and time when the question and the like were made.

The response processing unit 22 of the server 1 displays the bot-corresponding history INFB based on the history information of Table 2 and FIG. 26. Specifically, the history corresponding to the session ID of the call of the operator is acquired, and the bot correspondence history INFB is displayed based on the information stored in the history, for example, as in the screen illustrated in FIG. 25.

Figure 27:
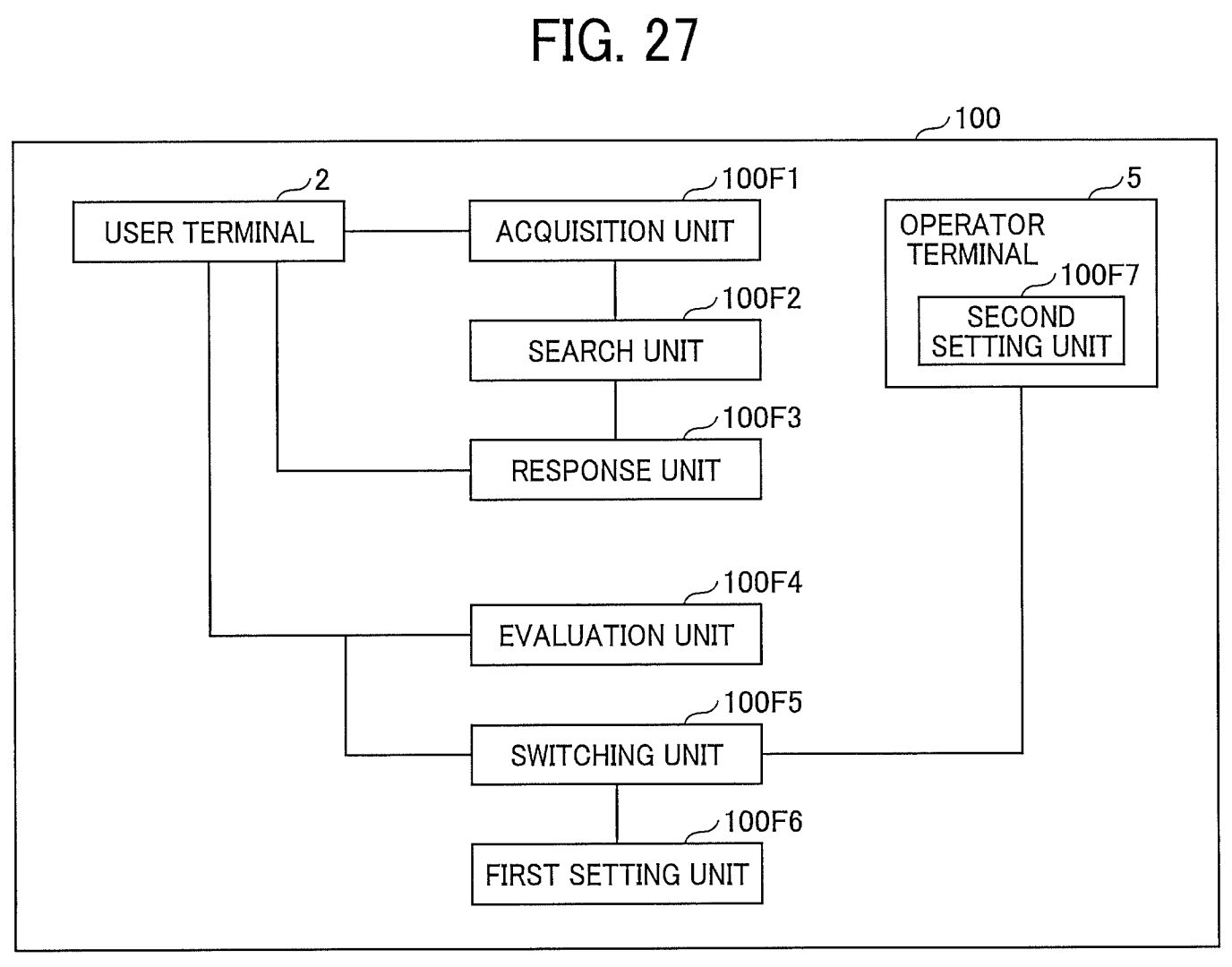

FIG. 27 is a block diagram illustrating an example of a functional configuration of the information processing system. For example, the chatbot system 100 includes an acquisition unit 100F1, a search unit 100F2, a response unit 100F3, an evaluation unit 100F4, and a switching unit 100F5. Further, the chatbot system 100 preferably includes a first setting unit 100F6 and a second setting unit 100F7. In the following, the illustrated functional configuration is described as an example.

The acquisition unit 100F1 performs an acquisition procedure for acquiring input information input to the user terminal. For example, the acquisition unit 100F1 is implemented by the communication I/F 105 or the like. In addition, the acquisition unit 100F1 includes the communication unit 31 and the like.

The search unit 100F2 performs a search procedure for searching response information for the input information. For example, the search unit 100F2 is implemented by the CPU 101 or the like. The search unit 100F2 includes the input information analysis unit 11 and the like.

The response unit 100F3 performs a response procedure of returning the response information to the user terminal in response to the input information. For example, the response unit 100F3 is implemented by the communication I/F 105 or the like. The response unit 100F3 includes the response processing unit 12 and the like.

The evaluation unit 100F4 performs an evaluation procedure for accepting an evaluation operation from the user terminal. For example, the evaluation unit 100F4 is implemented by the communication I/F 105 or the like. The evaluation unit 100F4 includes the communication unit 31 and the like.

The switching unit 100F5 performs a switching procedure for receiving a switching operation. For example, the switching unit 100F5 is implemented by the communication I/F 105 or the like. The switching unit 100F5 includes the response processing unit 12 and the like.

The first setting unit 100F6 performs a first setting procedure for setting whether to perform the manned support. For example, the first setting unit 100F6 is implemented by the communication I/F 105 or the like. The first setting unit 100F6 includes the operator management unit 34 and the like.

The second setting unit 100F7 performs a second setting procedure for setting whether or not the operator is available for the manned support. For example, the second setting unit 100F7 is implemented by the operation I/F 506 or the like. The second setting unit 100F7 is configured by the device control unit 5b and the like.

Although specific examples have been described above, the present disclosure is not limited to the examples and modifications described above. That is, various modifications and improvements are possible within the scope of the present disclosure. For example, embodiments obtained by variously modifying the embodiments and variations and embodiments obtained by combining the constituents of the different embodiments and variations are also within the scope of the present disclosure.

Further, for example, the user side control unit and the administrator side control unit are included in one server but may be included in two or more servers separately. In this case, the database may be provided separately from the server, and each of the two or more servers may communicate with the database.

Further, in the server according to the embodiments, each database stores character string information, but the present disclosure is not limited to the character string information. The database may store information such as images and sounds.

Further, the present disclosure may be a program for executing the information processing method or may be a non-transitory computer-readable recording medium in which the program is recorded. Needless to say, the above program can be distributed through a transmission medium such as the internet.

Further, the numbers such as the ordinal numbers and the quantities used above are all examples for specifically explaining the technique of the present disclosure, and the present disclosure is not limited to the exemplified numbers. Further, the connection relationship between the constituent elements is an example for specifically explaining the technique of the present disclosure, and the connection relationship for implementing the function of the present disclosure is not limited to the above description.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system comprising:
   a user terminal that receives input from a user;
   an operator terminal that receives input from an operator; and
   one or more information processing apparatuses connected to the user terminal and the operator terminal, the information processing system comprising:
   circuitry configured to:
   acquire input information that is input from the user terminal;
   search response information for the input information;
   respond to the user terminal with the response information in response to the input information;
   determine, based on a status of the operator, whether to perform a switching operation to perform a chat between the user terminal and the operator terminal; and
   control to:
   cause the user terminal to display the response information together with a button for performing the switching operation to switch to performing the chat between the user terminal and the operator terminal, upon determining that the switching operation is possible; and
   further cause the user terminal to display the response information without displaying the button for performing the switching operation, upon determining that the switching operation is not possible.

2. The information processing system of claim 1, wherein the circuitry is configured to determine whether to display a switching reception screen based on the state of the operator who operates the operator terminal.

3. The information processing system of claim 2, wherein the circuitry is configured to determine whether to display the switching reception screen based on whether the state of the operator who operates the operator terminal is one of available, not available, and occupied.

4. The information processing system of claim 1, wherein the circuitry is further configured to:
   set whether to chat between the user terminal and the operator terminal; and
   determine whether to display a switching reception screen based on settings.

5. The information processing system of claim 1, wherein the circuitry is configured to determine to display a switching reception screen when responding to the user terminal.

6. The information processing system of claim 1, wherein the circuitry is further configured to:

cause the user terminal to display an evaluation reception screen that receives input of evaluation for the response information from the user terminal; and determine to display a switching reception screen when displaying the evaluation reception screen on the user terminal.

7. An information processing method executed by an information processing system including a user terminal that receives input from a user, an operator terminal that receives input from an operator, and one or more information processing apparatuses connected to the user terminal and the operator terminal, the method comprising:

acquiring input information that is input from the user terminal;

searching response information for the input information;

responding to the user terminal with the response information in response to the input information;

determining, based on a status of the operator, whether to perform a switching operation to perform a chat between the user terminal and the operator terminal; and controlling to:

cause the user terminal to display the response information together with a button for performing the switching operation to switch to performing the chat between the user terminal and the operator terminal, upon determining that the switching operation is possible; and further cause the user terminal to display the response information without displaying the button for performing the switching operation, upon determining that the switching operation is not possible.

8. The information processing method of claim 7, wherein the method further comprises determining whether to display a switching reception screen based on the state of the operator who operates the operator terminal.

9. The information processing method of claim 8, wherein the determining whether to display the switching reception screen includes determining based on whether the state of the operator who operates the operator terminal is one of available, not available, and occupied.

10. The information processing method of claim 7, wherein the method further comprises:

determining whether to display a switching reception screen, and setting whether to chat between the user terminal and the operator terminal, wherein the determining whether to display the switching reception screen includes determining whether to display the switching reception screen based on settings.

11. The information processing method of claim 7, wherein the method further comprises determining whether to display a switching reception screen, and wherein the determining whether to display the switching reception screen includes determining to display the switching reception screen when responding to the user terminal.

12. The information processing method of claim 7, wherein the method further comprises:

determining whether to display a switching reception screen, causing the user terminal to display an evaluation reception screen that receives an evaluation for the response information from the user terminal, wherein the determining whether to display the switching reception screen includes determining to display the switching reception screen when displaying the evaluation reception screen on the user terminal.

13. An information processing system comprising:

a user terminal that receives input from a user;

an operator terminal that receives input from an operator; and one or more information processing apparatuses connected to the user terminal and the operator terminal, the information processing system comprising:

circuitry configured to:

acquire identification information from the user terminal and input information input to the user terminal;

search response information for the input information;

respond to the user terminal with the response information in response to the input information;

determine, based on the identification information acquired from the user terminal, whether to perform a switching operation to perform a chat between the user terminal and the operator terminal; and control the switching operation based on a determination result, wherein the circuitry is further configured to transmit the input information in association with tenant information of the user in relation to a service;

search for service contract information relating to the service based on the tenant information;

display a switching reception screen for the switching operation on the user terminal in a case where the circuitry determines that the service contract information indicates the service includes support provided by the operator.

14. The information processing system of claim 13, wherein the circuitry is further configured to display the switching reception screen for the switching operation on the user terminal in a case where the circuitry determines that the service contract information indicates the service includes support provided by the operator, and operator availability status information indicating that the operator of the operator terminal is available has been received from the operator terminal.

\* \* \* \* \*